US012783532B2

(12) United States Patent
Bonaci et al.

(10) Patent No.: US 12,783,532 B2
(45) Date of Patent: Nov. 3, 2026

(54) FEATURE ENGINEERING SYSTEM

(71) Applicant: International Business Machines Corporation, Armonk, NY (US)

(72) Inventors: Davor Bonaci, Seattle, WA (US); Benjamin Chambers, Seattle, WA (US); Jordan Frazier, Seattle, WA (US); Emily Kruger, Seattle, WA (US); Ryan Michael, Seattle, WA (US); Charles Maxwell Scofield Boyd, Seattle, WA (US); Charna Parkey, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 17/589,395

(22) Filed: Jan. 31, 2022

(65) Prior Publication Data

US 2022/0156254 A1 May 19, 2022

Related U.S. Application Data

(63) Continuation-in-part of application No. 17/177,115, filed on Feb. 16, 2021, now Pat. No. 11,238,354, (Continued)

(51) Int. Cl.
*G06F 16/24* (2019.01)
*G06F 16/2455* (2019.01)
(Continued)

(52) U.S. Cl.
CPC ........ *G06F 16/248* (2019.01); *G06F 16/2455* (2019.01); *G06F 21/6218* (2013.01); *G06N 20/00* (2019.01)

(58) Field of Classification Search
CPC ............... G06F 16/248; G06F 16/2455; G06F 21/6218; G06F 16/901; G06F 16/24568; G06N 20/00
(Continued)

(56) References Cited

U.S. PATENT DOCUMENTS 10,649,794 B2 5/2020 Moon et al.
10,719,301 B1 7/2020 Dasgupta et al.
(Continued)

OTHER PUBLICATIONS

Kenda et al "Streaming Data Fusion for the Internet of Things", pp. 1-27, Published:Apr. 25, 2019 (Year: 2019).*
(Continued)

*Primary Examiner* — Hicham Skhoun
(74) *Attorney, Agent, or Firm* — Cantor Colburn LLP; Rakesh Roy

(57) ABSTRACT

A system for generating machine learning feature vectors or examples is disclosed herein. The system comprises at least one database configured to store data indicative of events associated with a plurality of entities, an application programming interface (API) server configured to receive a user query from at least one user device, and at least one computing node in communication with the API server and the at least one database. The at least one computing node is configured at least to receive, from the API server and at a first time, a first indication of the user query. The at least one computing node is configured to generate, based at least on the data indicative of events and the first indication of the user query, results associated with the user query, wherein the results comprise one or more feature vectors or examples for use with a machine learning algorithm. The at least one computing node is configured to cause storage of data indicative of the results in the at least one database.

18 Claims, 20 Drawing Sheets

Related U.S. Application Data which is a continuation-in-part of application No. 16/877,407, filed on May 18, 2020, now Pat. No. 11,354,596.

(60) Provisional application No. 62/969,639, filed on Feb. 3, 2020.

(51) Int. Cl.

| | |
|---|---|
| ***G06F 16/248*** | (2019.01) |
| ***G06F 21/62*** | (2013.01) |
| *G06N 20/00* | (2019.01) |

(58) Field of Classification Search

USPC ........................................................ 707/758

See application file for complete search history.

(56) References Cited

U.S. PATENT DOCUMENTS

| | | | | |
|---|---|---|---|---|
| 10,803,187 | B2 | 10/2020 | Viswanathan et al. | |
| 11,238,354 | B2 | 2/2022 | Bonaci et al. | |
| 11,354,596 | B2 | 6/2022 | Bonaci et al. | |
| 11,450,419 | B1 * | 9/2022 | Esman | G16H 20/13 |
| 2015/0269495 | A1 | 9/2015 | Dalessandro et al. | |
| 2016/0078362 | A1 * | 3/2016 | Christodorescu | G06N 20/10 706/12 |
| 2017/0091673 | A1 | 3/2017 | Gupta et al. | |
| 2017/0140261 | A1 | 5/2017 | Qamar | |
| 2017/0178135 | A1 * | 6/2017 | Bull | G06Q 20/40 |
| 2017/0286843 | A1 | 10/2017 | Yamamoto et al. | |
| 2018/0067732 | A1 | 3/2018 | Seetharaman et al. | |
| 2018/0248904 | A1 | 8/2018 | Villella et al. | |
| 2018/0260728 | A1 | 9/2018 | Mathew et al. | |
| 2019/0251467 | A1 | 8/2019 | Lokare et al. | |
| 2019/0272478 | A1 | 9/2019 | Fuchs | |
| 2019/0286746 | A1 | 9/2019 | Li et al. | |
| 2019/0311301 | A1 | 10/2019 | Pyati | |
| 2019/0325258 | A1 | 10/2019 | Stein et al. | |
| 2019/0347578 | A1 | 11/2019 | Bolding et al. | |
| 2019/0378210 | A1 | 12/2019 | Merrill et al. | |
| 2020/0005045 | A1 * | 1/2020 | Lloyd, II | G06V 10/96 |
| 2020/0090056 | A1 | 3/2020 | Singhal et al. | |
| 2020/0233571 | A1 | 7/2020 | Yuravlivker et al. | |
| 2020/0285997 | A1 | 9/2020 | Bhattacharyya et al. | |
| 2021/0027181 | A1 * | 1/2021 | Roden | G06F 21/604 |
| 2023/0281527 | A1 * | 9/2023 | Cella | G06V 20/17 705/7.17 |

OTHER PUBLICATIONS

Kenda, “Streaming Data Fusion for the Internet of Things”, Sensors, 2019.

Smith, “FeatureHub: Towards collaborative data science”, 2017, International Conference on Data Science and Advanced Analytics.

Kanter, “Deep Feature Synthesis: Towards Automating Data Science Endeavors”, IEEE, 2015.

Kenda et al.; “Streaming Data Fusion for the Internet of Things”; Sensors; vol. 19(8); 2019; 27 pages.

International Patent Application No. PCT/US2021/016445; Int’l Search Report and the Written Opinion; dated Mar. 3, 2021; 11 pages.

* cited by examiner

900

1000

1200

FEATURE ENGINEERING SYSTEM

CROSS-REFERENCE TO RELATED APPLICATIONS

The present application is a Continuation-in-Part of U.S. patent application Ser. No. 17/177,115 filed Feb. 16, 2021, which is a Continuation-in-Part of U.S. patent application Ser. No. 16/877,407 filed May 18, 2020, which claims the benefit of U.S. Provisional Patent Application No. 62/969,639 filed Feb. 3, 2020, the entire contents of both of which are incorporated by reference herein.

BACKGROUND

In machine learning, a feature is an observable property of an object in a dataset. A feature vector is a list of features of an object in a dataset. The feature vector may be generated from information about the object and events related to the object.

Feature vectors are used in the training stage, the validation stage, and the application stage of machine learning. In the training stage, a model is produced using a plurality of feature vectors representing training data. The plurality of feature vectors, each representing a training example, is fed to a machine learning algorithm to train the model. In the validation stage, feature vectors from the validation set, generally distinct from the training examples, are fed to the model to produce a prediction and/or to evaluate accuracy. In the application stage, a feature vector (e.g., a feature vector from the training set or validation set or a different feature vector) is fed to the model to produce a prediction.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
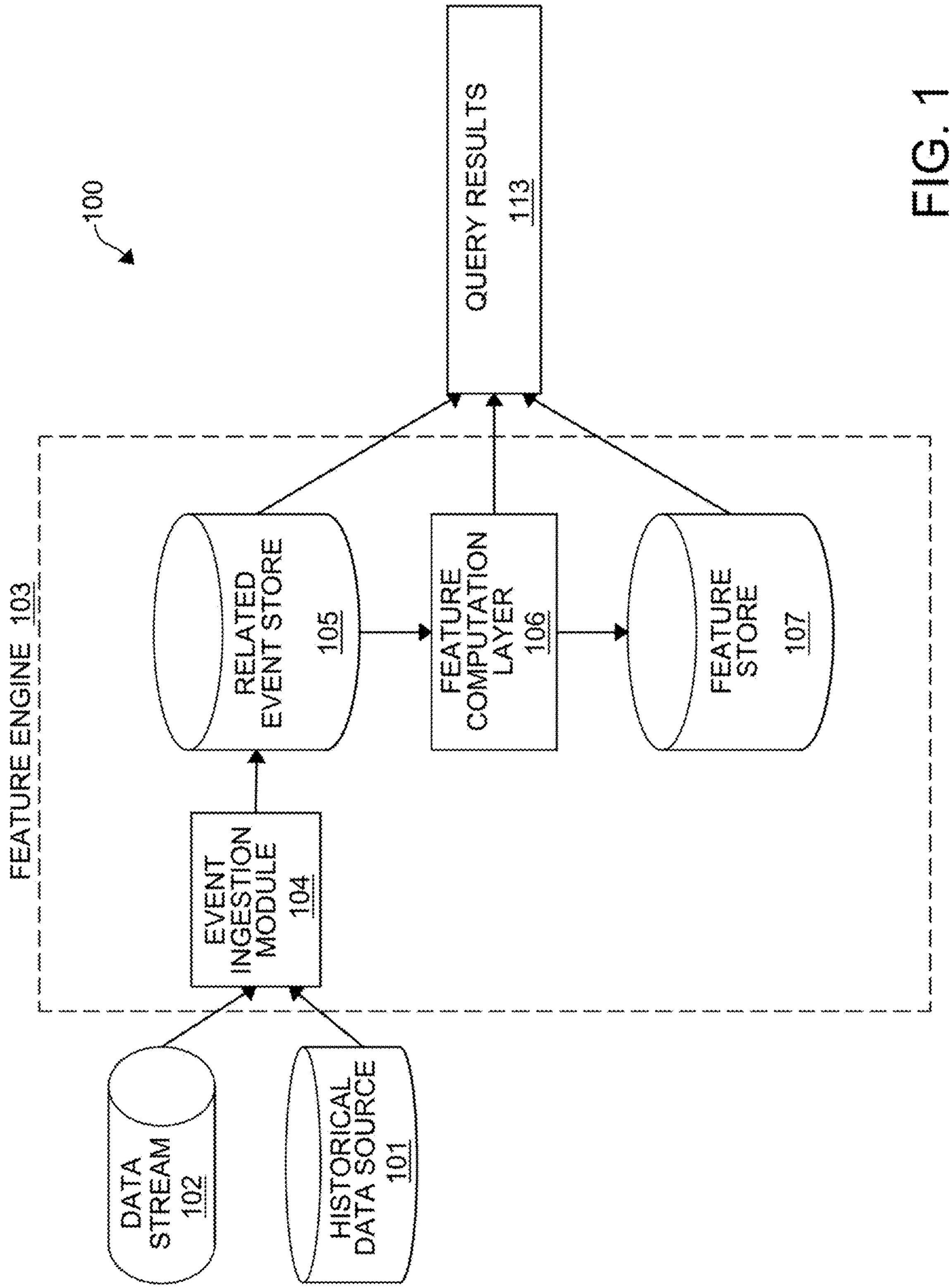
FIG. 1 shows example feature engineering system ingesting data and outputting query results.

Current machine learning algorithms may be used to make a prediction about the likelihood of a particular occurrence, based on different variables. For example, a machine learning algorithm may be used to predict the value of a particular house or to predict whether a particular transaction was fraudulent. These current machine learning algorithms may be helpful in that they make these predictions in a more efficient manner than a human may be able to. An event-based model, such as a model that makes predictions about specific points-in-time may be produced by providing a machine learning algorithm with training examples at relevant points-in-time. For example, to produce an event-based model that is able to make accurate predictions about specific points in time (such as when a house is listed), the model must have been trained on examples from representative points in time (when previous houses were listed).

However, generating the features to train such a machine learning algorithm so that it is able to make accurate event-based (i.e. point-in-time) predictions is a difficult task. To generate such training examples, a large number of features may need to be computed at a large number of different times. In other words, aggregates over different sets of events may need to be computed. However, a data scientist may not be able to generate these features because the data scientist is unable to access event-based data. Rather, he or she may only have access to a database containing properties which have already been computed based on events. As a result, the data scientist may only have access to current values listed in the database. For example, the data scientist may be able to figure out how many times a particular house has been listed for sale, but may not have access to data that reveals how many times that house has been listed for sale within a particular time frame, such as within the last year. Even if the data scientist is able to access event-based data, using the event-based data to create features to train a time-sensitive model may be labor and time intensive. For example, the data scientist may need to spend months writing complex code to manipulate the event-based data in order to generate the necessary features.

To further complicate the issue, even if the data scientist takes the time to create these features, the event-based model may be incapable of being used in production. Once trained using the features generated by the data scientist, the model would ideally be able to generate results or make predictions during the application stage. During application, the model needs to receive, as input, a feature in order to generate a result or make a prediction based off of the input feature. The input features need to be defined in the same manner as the features used during training. However, the system that the data scientist used to create the training features may not be able to generate these features to input to the model during application in a real-time, scalable manner. For example, features may continuously change in real-time as new data arrives.

Accordingly, it may be desirable to provide a mechanism for generating event-based feature vectors and/or training examples to train a model so that it is able to make accurate event based (i.e. point-in-time) predictions. For example, it may be desirable to provide a mechanism for generating event-based feature vectors and/or training examples using arbitrary times or data dependent times. Additionally, it may be desirable to provide a mechanism for generating event-based feature vectors and/or examples, such as training and/or validation examples, using multiple times. For example, it may be desirable to compute the value of an event-based feature vectors and/or training example at both a first time, such as 10:00 a.m., and a second time, such as 11:00 a.m. so that the model can predict what will happen within the next hour. It may also be desirable to provide a mechanism for implementing, in a real-time, scalable manner, a machine learning algorithm trained using these event-based features. For example, it may be desirable to provide a mechanism for maintaining feature values in real time as new data arrives. As another example, instead of a data scientist writing features for training and asking a different party to implement the trained model in another system, it may be desirable to make the same feature definition that is used for training to be automatically made available in production.

A feature engineering system may be used to generate both the training features and/or examples for a model and the features and/or examples used during production, or application of that model. Using the same system for feature creation during both the training and application stages allows for the same feature definition to be used during training and application. As the feature engineering system is able to generate training features for a model, data scientists no longer need to spend large amounts of time writing complex code in order to generate these training features themselves. Rather, data scientists are able to define the features and configure example selection using a user-friendly interface, and the feature engineering system can use this information to create the desired features. The feature engineering system may also be able to maintain feature values in real-time as new data arrives at the feature engineering system. This ability to maintain feature values in real time may improve the accuracy of the model. For example, the model may be able to make more accurate predictions, or a larger percentage of the predictions that the model makes may be accurate. The accuracy of the model may be improved because predictions made with more recent feature values more accurately reflect the current interests/environments, etc. that the prediction is being made about.

FIG. 1 shows an example feature engineering system 100. Feature engineering system 100 ingests data from data sources 101, 102, stores the data, and uses the data for computation of features. Ingestion and/or storing of the data continuously and/or as new data becomes available allows for up-to-date feature computations. A user can query feature engineering system 100 at any time to receive features based on the most current ingested data or data from a particular time. In machine learning and pattern recognition, a feature is an individual measurable property or characteristic of a phenomenon, object, or entity being observed. Choosing informative, discriminating, and independent features is an important step for effective algorithms in pattern recognition, classification, and regression. Features can be numeric, such as values or counts. Features can be structural, such as strings and graphs, like those used in syntactic pattern recognition.

In an embodiment, feature engineering system 100 is configured to use the data from data sources 101,102 to efficiently provide and/or generate features for a user to use in the training or application stage of machine learning. In the training stage, a model is produced by providing a machine learning algorithm with training data, such as several training examples. Each training example includes properties, such as features. The properties may include a label or target, such as in supervised machine learning. A set of features for a specific instance or entity is known as a feature vector. Each training example may include several feature vectors, which may be organized in columns with the same properties described for each instance or entity. In supervised machine learning, a model may be produced that generates results or predictions for an entity based on a feature vector that is input and associated with that entity. The algorithm produces a model that is configured to minimize the error of results or predictions made using the training data. The model may be, for example, an event-based model that generates results or predictions about the outcome of an event and/or the probability of the event occurring.

Feature engineering system 100 may be configured to efficiently generate feature vectors and/or examples, such as training or validation examples, to provide to the machine learning algorithm. In an embodiment, feature engineering system 100 may be configured to generate feature vectors and/or examples associated with a particular entity. As is discussed below in more detail, a user of system 100, such as a data scientist, may be responsible for instructing system 100 which entity or entities should be included in the feature vectors and/or examples. For example, if the user of system 100 wants to train a model to predict how much homes will sell for in Seattle, the user of system 100 may instruct system 100 to choose houses in Seattle as the entities that should be included in the feature vectors and/or examples. If the user instructed system 100 to choose, for example, houses in Los Angeles as the set of entities that should be included in the feature vectors and/or examples, the model may not be able to accurately predict selling prices for homes in Seattle.

In an embodiment, feature engineering system 100 may be configured to generate the feature vectors and/or examples by combining feature values for an entity at more than one point-in-time. Feature vectors and/or examples that are generated by combining feature values at more than one point-in-time may be useful for applying or training an event-based model so that it is able to make accurate event-based predictions at point(s)-in-time. An event-based model may, for example, predict if an individual will quit a subscription service within the next month. As another example, an event-based model may predict, when a house is listed for sale, how much that house will eventually sell for. As another example, an event-based model may predict, when a flight is scheduled, whether that flight will eventually depart on time.

As discussed above, a model may be produced by providing a machine learning algorithm with training examples. Accordingly, an event-based model may be produced by providing a machine learning algorithm with training examples at relevant points-in-time. Feature engineering system 100 may generate these training examples at relevant points-in-time by combining feature values at more than one arbitrary point-in-time, such as at one or more first times ("prediction times") and at a corresponding second time ("a label time") associated with each prediction time. The prediction time(s) may occur at a time at which a prediction about an event is made, and the corresponding label time may be a time at which an outcome of the event is known. As is discussed below in more detail, the configuration of the selection of these arbitrary points-in-time may be input by a user of system 100, such as a data scientist that wants to generate event-based features to train an event-based model. Feature engineering system 100 may receive selection configuration from the user and generate the desired features. Because the user of system 100 understands its own data and the problem that needs to be solved, the user of system 100 may be best equipped to configure the selection of these arbitrary points-in-time.

The user of system 100 may configure the selection of one or more prediction times and corresponding label times. The manner in which the user configures the prediction time(s) and label time selection may depend on the model that needs to be trained. For example, if an event-based model is supposed to predict whether an individual will quit a subscription service within the next month, then the user may configure the prediction time(s) to be selected at any point-in-time at which an individual is subscribed to the subscription service, and the corresponding label time to be selected at the point-in-time that is one month after the prediction time(s). As another example, if an event-based model is to predict, when a house is listed for sale, how much that house will eventually sell for, then the user may configure a prediction time to be selected at the point-in-time at which the house was listed for sale and the corresponding label time to be selected at the point-in-time at which the house eventually sells. As yet another example, if an event-based model is to predict, when a flight is scheduled, whether that flight will depart on time, then the user may configure a prediction time to be selected at the point-in-time at which the flight was scheduled and the corresponding label time to be selected at the point-in-time at which the flight eventually departs.

The user may configure the selection of prediction time(s) used to generate the training examples for the event-based model in a variety of different ways. In an embodiment, the user may configure the prediction time(s) to be selected at fixed times. If the prediction time(s) are configured to be selected at fixed times, the prediction time(s) may be configured to be selected at a fixed time before the corresponding label times. For example, the prediction time(s) may be configured to be selected a month, three weeks, 24-hours, one-hour, or any other fixed time before the label times. For example, as discussed above, if an event-based model is to predict whether an individual will quit a subscription service within the next month, then the user may configure the prediction time(s) to be selected at any point-in-time at which an individual is subscribed to the subscription service, and the label times to be selected at the points-in-time one month after the corresponding prediction times. In another embodiment, the user may configure the prediction time(s) to be selected when a particular event occurs. If the user configures the prediction time(s) to be selected when a particular event occurs, then the selection of prediction time(s) may not be dependent on the selection of label times. For example, as discussed above, if an event-based model is to predict, when a house is listed for sale, how much that house will eventually sell for, then the user may configure the prediction time(s) to be selected at those points-in-time at which houses are listed for sale. In another embodiment, the user may configure the prediction time(s) to be selected at computed times. For example, if an event-based model is to predict whether a scheduled flight will depart on time, then the user may configure the prediction time(s) to be selected at points-in-time calculated to be one hour before scheduled flight departure times.

Similarly, the user may configure the selection of corresponding label times used to generate the training examples for the event-based model in a variety of different ways. In an embodiment, the user may configure the label times to be selected at fixed times. The fixed time may be, for example, today, or on the 1$^{st}$ of a month, or any other fixed time. In another embodiment, the user may configure the label times to be selected at fixed offset times after the prediction times. For example, as discussed above, if an event-based model is to predict whether an individual will quit a subscription service within the next month, the user may configure the label times to be selected at the points-in-time that occur one month after the respective prediction time(s). In another embodiment, the user may configure the label times to be selected when a particular event occurs. For example, as discussed above, if an event-based model is to predict, when a house is listed for sale, how much that house will eventually sell for, then the user may configure the label times to be selected at those points-in-time at which houses eventually sell. In another embodiment, the user may configure the label times to be selected at computed times. For example, if an event-based model is to predict whether scheduled flights will depart on time, then the label times may be configured to be selected at points-in-time calculated to be the scheduled departure times. The user of system 100 understands its own data and the problem that needs to be solved, so the user of system 100 may be best equipped to define the manner in which the prediction time(s) and corresponding label time(s) should be selected by system 100.

Feature engineering system 100 may be configured to generate negative training examples, in addition to positive training examples, to provide to the machine learning algorithm. If a model is trained using only positive training examples, the model will not be able to make accurate predictions. For example, if an event-based model is supposed to predict whether an individual will quit a subscription service within the next month, but the model is only trained with examples of individuals quitting the subscription service, then the model will always predict that individuals will quit the subscription service within the next month. To prevent this, the model may be trained using negative training examples in addition to positive training examples. For example, the model may be trained using examples of individuals that did not quit the subscription service. These negative training examples may be generated by feature engineering system 100 in the same manner as positive training examples.

In an embodiment, feature engineering system 100 may be configured to sample the training examples in various ways. For example, feature engineering system 100 may be configured to select at most one training example from each entity. As another example, it may be configured to sample a certain number of training examples from the set of selected entities. The sampling may be random or stratified to produce a certain number of positive and negative examples. If feature engineering system 100 samples the training examples, this may involve the feature engineering system 100 selecting which training examples should be used to train the model. Depending on what the model is going to be used to predict, certain training examples may not be useful, and should therefore not be used to train the model. When sampling the training examples, feature engineering system 100 may not select those less-useful training examples. The manner in which the training examples are sampled by feature engineering system 100 may be specified by the user of the system 100, such as the data scientist. The user of system 100 understands its own data and the problem that needs to be solved, so the user of system 100 may be best equipped to define the manner in which the training examples should be sampled.

As an illustrative example, if the user of system 100 wants training examples for a model that is supposed to predict if an individual will quit their job, the user of system 100 may want the sample to include examples of both individuals that quit and individuals that did not quit. As another illustrative example, if the user of system 100 wants training examples for a model that is supposed to predict if a house will sell, the user of system 100 may want the sample to include only examples of houses that did sell. As another illustrative example, if the user of system 100 wants training examples for a model that is supposed to predict how many months it will take for a house to sell, the user of system 100 may want the sample to include examples of both houses that sold and houses that have not sold.

After a model, such as an event-based model, has been trained using the training examples generated by system 100, the model may be used, in the application stage, to generate results or make predictions. During the validation stage, the trained model may additionally be tested or evaluated based on the generated results or predictions. The model may be evaluated based on the accuracy or error of the data in the generated feature vector.

Feature engineering system 100 is configured to use the data from data sources 101,102 to efficiently provide and/or generate feature vectors, such as a predictor feature vector, for a user to use in the application stage. Applying the model may involve computing a feature vector using the same computations that were used in training of the model, but for an entity or time that may not have been part of the training or validation examples. Because feature engineering system 100 is also configured to generate feature vectors for the user to use in the training stage, the same feature vector definitions that were used for training are automatically available during production. As discussed above, making the same feature vector definitions used for training automatically available during production allows for event-based models to be successfully used in production. For example, feature engineering system 100 may provide and/or generate predictor feature vectors for a user to use in the application stage, while the feature engineering system 100 may provide and/or generate predictor and label feature vectors for a user to use in the training and validation stage. Feature engineering system 100 may generate the feature vectors and/or validation examples in a similar manner as described above for training examples.

System 100 is configured to ingest event data from one or more sources 101, 102 of data. In some configurations, a data source includes historical data, e.g., from historical data source 101. In that case, the data includes data that was received and/or stored within a historic time period i.e. not real-time. The historical data is typically indicative of events that occurred within a previous time period. For example, the historic time period may be a prior year or a prior two years, e.g., relative to a current time, etc. Historical data source 101 may be stored in and/or retrieved from one or more files, one or more databases, an offline source, and the like or may be streamed from an external source. The historical data ingested by system 100 may be associated with a user of system 100, such as a data scientist, that wants to train and implement a model using features generated from the data. System 100 may ingest the data from one or more sources 101,102 and use it to compute features.

In another aspect of example feature engineering system 100, the data source includes a stream of data 102, e.g., indicative of events that occur in real-time. For example, stream of data 102 may be sent and/or received contemporaneous with and/or in response to events occurring. In an embodiment, data stream 102 includes an online source, for example, an event stream that is transmitted over a network such as the Internet. Data stream 102 may come from a server and/or another computing device that collects, processes, and transmits the data and which may be external to the feature engineering system. The real-time event-based data ingested by system 100 may be associated with a user of system 100, such as a data scientist, that wants to train and implement a model using features generated from the data. System 100 may ingest the real-time event-based data from one or more sources 101,102 and use it to compute features. For example, system 100 may ingest the real-time event-based and use it, in combination with historical data, to compute features.

Because feature engineering system 100 is configured to ingest the stream of data 102 in real-time and use it to compute features, a user of system 100 is able to implement, in a real-time, scalable manner, a machine learning algorithm trained using these event-based features. By maintaining feature values in real time as new data arrives—as opposed to just training the model once—the accuracy of the model will improve. For example, after training, a model that is supposed to predict whether transactions are fraudulent may have a 70% accuracy rate. However, this is not good enough. Some legitimate transactions may be flagged as fraudulent, and some fraudulent transactions will go undetected. The accuracy of the model can be improved through an iterative process. As new data comes in, or as new features start being used, the accuracy of the model may significantly improve. For example, the model may, over time, achieve an accuracy rate of 90-95%.

The data from sources 101,102 may be raw data. The raw data may be unprocessed and/or arbitrarily structured. In an embodiment, the data from sources 101,102 may be organized in fields and/or tables, such as by system 100. If source 101,102 is a database, e.g., a relational database, it may have a schema. The schema is a system that defines the fields, the tables, relationships, and/or sequences of the data in the database. The schema can be provided to feature engineering system 100 to provide a definition of the data. The fields can have one or more user-defined labels. The labels can be provided to feature engineering system 100 to provide a definition of the data.

In an embodiment, the ingested data is indicative of one or more events. The ingested data is indicative of one or more entities associated with one or more of the events. An example of an event may include a browsing event or a watch event, e.g., a click stream. An example of the entity may include a user or a product, etc. Another example of an event may be a house listing or a house sale. Another example of an entity may be the house or realtor, etc. As described above, a user of system 100 may want to use data indicative of one or more events to generate feature vectors and/or examples for an event-based model. When generating a training example to make a prediction 6 months before a label time, only the data available at that particular prediction time should be included in that particular training example. However, without event-based data, a user may be unable to compute such features because the user only has access to current or periodic snapshot aggregate values, thus making it impossible to compute features at arbitrary points-in-time. For example, the user of system 100 may have been able to look at the data indicative of one or more events to determine how many times a particular house has been listed for sale but may not have been able to look at that same data to determine how many times that house has been listed for sale within a particular time frame, such as within the last year. Feature engineering system 100 remedies this problem by ingesting the data indicative of one or more events and computing the event-based features for the user of system 100.

In an embodiment, system 100 includes a feature engine 103. Feature engine 103 is operable on one or more computing nodes which may be servers, virtual machines, or other computing devices. The computing devices may be a distributed computing network, such as a cloud computing system or provider network. Feature engine 103 is configured to implement a number of the functions and techniques described herein.

According to an embodiment, feature engine 103 includes an event ingestion module 104. Event ingestion module 104 is configured to ingest the data from one or more of sources of data 101, 102. For example, event ingestion module 104 may import data from historical data source 101, such as to perform a set-up and/or bootstrap process, and also may be configured to receive data from stream of data 102 continuously or in real-time. The data ingested by feature engine 103 may be used by system 100 to provide and/or generate features for a user to use in the training or application stage of machine learning.

In an embodiment, event ingestion module 104 is configured to perform pre-computations on the data from data sources 101,102 to efficiently provide and/or generate features for a user to use in the training or application stage of machine learning at a later time. These pre-computations, or initial processing steps, include loading the input, partitioning it by entity, and ordering it by time. This often takes a significant portion of the overall processing time since it deals with the entire data set. By pre-computing these results the actual query is significantly faster. The pre-computation may be performed during event ingestion or prior to executing a query. Keeping the pre-computations focused on how information is organized ensures they are applicable to most subsequent queries since the information structure changes less often than the queries being computed over that structure. This allows the time spent preparing the data to be reused across queries that have not changed—allowing the user to experiment with different choices more quickly.

According to another aspect of the disclosed subject matter, event ingestion module 104 is configured to assign events arrival timestamps, such as based on ingesting the data indicating the events. Additionally, event ingestion module 104 may be configured to assign the arrival timestamps using a distributed timestamp assignment algorithm. In an embodiment, the distributed timestamp algorithm assigns timestamps comprising a plurality of parts. For example, a part of a timestamp may have a time component. According to an aspect, the time component indicates an approximate comparison between machines, such as an approximate comparison between a time that data source 101, 102 sent the data and a time that feature engine 103 ingested the data. According to another aspect, the timestamp may have a unique machine identification (ID) that prevents duplicate timestamps among other things. According to yet another aspect, the timestamp has a sequence number. An aspect of the sequence number allows multiple timestamps to be generated. The timestamps may be used to indicate a total order across all events. If events from data stream 102 are a partitioned stream, e.g., a Kafka stream, a Kinesis stream, etc., the timestamps indicate a total order across all events and indicate an order of the events within each partition. The timestamps facilitate approximate comparisons between events from different partitions.

In some embodiments, the ingested data includes an indication of an occurrence time associated with an event. The occurrence time is a time that the event occurred. The occurrence time may be different than the time component and/or an arrival time associated with the event and/or the ingested data.

According to an aspect, feature engine 103 is configured to determine one or more entities associated with an event in the ingested data. For example, feature engine 103 may determine the at least one entity associated with the event using the schema, the fields, and/or the labels of the data. As another example, the ingested data may indicate at least one entity, such as by a name, number, or other identifier. If an event is associated with more than one entity, each entity may be relevant to different prediction tasks. For example, if an event is a house listing, the event may be associated with more than one entity, such as one or more of the house entity, the neighborhood entity, or the realtor entity, etc. Each of these entities may be relevant to different prediction tasks. For example, when making a prediction about the house-listing, to compute some features, properties of the realtor may be used, whereas for other features, properties of the neighborhood may be used.

Feature engine 103 may also be configured to group events in the ingested data by entity. If the ingested data is event-based data, the ingested data may inherently be partitioned by entity. Partitioning ingested event-based data by entity facilitates the efficient creation of event-based features by system 100. As discussed above, a user of system 100 may configure the selection of one or more entities that should be included in the examples. Because the event-based data is already partitioned by entity, system 100 can quickly access the data for the selected one or more entities, use it to compute feature values for the selected one or more entities, and combine the feature values to create the desired examples.

In embodiments, feature engine 103 may be configured to de-duplicate events. If a duplicate of some events is received, ingesting the data may include de-duplicating the events. Techniques for de-duplicating the events may include using unique identifiers associated with events to track events that have been ingested. If an event arrives having a unique identifier that is a duplicate of a unique identifier of an event that has already been ingested, the arriving event may be ignored.

In embodiments, feature engine 103 may be configured to de-normalize events. In particular, events may be associated with more than one entity. De-normalizing an event includes storing a copy of an event for each entity associated with the event. Notably, this is different from de-duplicating events in that de-duplicating recognizes and removes duplicates from the same set of data so that the feature engine does not double count events, for example. As an example, if an event is a flight departure, the event may be associated with more than one entity, such as one or more of the airports from which the flight is departing, the destination airport, the airplane, the route, or the airline, etc. De-normalizing this event may include storing a copy of the event for one or more of the airports from which the flight is departing, the destination airport, or the airline. As another example, if an event is a house listing, the event may be associated with more than one entity, such as one or more of the house entity, the neighborhood entity, or the realtor entity, etc.

In embodiments, feature engine 103 may be configured to filter the data. Filtering the data includes such actions as determining optimal events and/or events that may be used to determine a feature. Feature engine 103 may be configured to continuously group, de-normalize, and/or filter data as it is received, such as from data stream 102.

In embodiments, feature engine 103 includes one or more related event stores 105. In that instance, feature engine 103 is configured to store an indication of an entity associated with an event in one or more related event stores 105. Feature engine 103 is configured to store groupings of events associated with common entities in one or more related event stores 105. Feature engine 103 is configured to continuously store and/or update associated data stored to one or more related event stores 105 as data is ingested, such as from data stream 102. One or more related event stores 105 facilitates efficient, on-demand access to results 113 to a user query. For example, system 100 can quickly access the data in the one or more related events stores 105, use it to compute feature values for one or more selected entities, and combine the feature values to create the desired examples.

In embodiments, feature engine 103 is configured to receive a user query from a user of system 100 and, in response, output query results 113. As discussed above, a user of system 100 may want the system to generate examples for a model, such as an events-based model. The user of system 100 configures which entity or entities should be selected when generating the examples, configures the selection of point(s)-in-time at which feature values for each selected entity should be computed when generating the examples, and configures how to sample the examples. The user query received by feature engine 103 may indicate all of these configurations by the user: entity configuration, point(s)-in-time configuration, and sample configuration. Feature engine 103 receives the user query and, in response, outputs query results 113. Query results 113 may include events associated with specific entities, such as the entities configured to be selected by the user, at specific times, such as the point(s)-in time configured to be selected by the user. Query results 113 may be sampled in the manner configured by the user. Query results 113 may include statistics across a plurality of entities. For example, the user may send, to feature engine 103, a user query in which the user configured more than one entity to be selected.

Feature engine 103 includes a feature computation layer 106. Feature computation layer 106 is configured to determine one or more features associated with an entity. The features to be determined are defined by a user, as described above. In embodiments, feature computation layer 106 is configured to determine a feature using a feature configuration for the feature. In embodiments, the feature configuration is received from a user, such as from a feature studio as described more fully herein. The feature configuration may be simple for the user to generate. For example, to generate the feature configuration the user may indicate how an entity or entities should be selected by feature computation layer 106 during the example generation, how to select the point(s)-in-time at which feature values for the selected entities should be computed when generating the examples, and how to sample the examples. The user does not have to spend large amounts of time writing complex code in order to create the desired features—rather the user can quickly generate the feature configuration, and feature computation layer 106 will do the work of generating the desired features for the user based on the configuration.

In embodiments, feature computation layer 106 is configured to determine the features using the raw data and/or events stored to related event store 105. The feature computation layer 106 may be configured to determine the features by applying a variety of numerical processes to the data, such as arithmetic operations, aggregations, and various other techniques. In an embodiment, a user of the system 100 may determine useful features for a model by evaluating the features generated by feature computation layer 106 using both numerical methods and attempts to train a model using the examples generated from these features. By attempting to train the model using the generated examples, the user may see if the model trained using the features of interest has less error, such as by testing the model using a validation set, as compared to the model trained with different features.

If the user trains the model using the generated examples but sees that the model is not producing accurate results, the user may want different examples for training the model, more examples for training the model, or different features to be used in the example generation. To instruct feature engine 102 to generate different or more examples for training the model, or to generate the examples using different features, the user can send a new user query to feature engine 103. In the new user query, the user may instruct system 100 to use a different configuration select one or more entities that should be included in the examples, to use a different configuration to select point(s)-in-time at which feature values for the selected entity should be computed, or to use a different configuration for sampling the examples. Feature engine 103 may receive this new user query and outputs new query results 113. The user can train the model using these new examples to see if the model is now able to produce more accurate results. Again, the user does not have to spend large amounts of time writing complex code in order to create the new, desired features—rather the user can quickly generate a new feature configuration by modifying their previous instructions to system 100. The user can continue to do so until the model is producing results at a desired accuracy level.

Selection of useful values for a model may reduce a number of training examples needed to train the model. When more features are used to train and/or use a model, exponentially more training examples are needed to train the model. Determining a good combination of features for a model involves balancing the usefulness of the information captured by each feature with the additional need for training data that the feature imposes. Therefore, determining useful features enables production of a good model with a minimal number of training examples needed to produce the model.

In an embodiment, the quality of the model may be improved by employing iterative learning techniques. Iterative learning can improve the quality of the model if the model is not producing accurate enough results. The model may not produce highly accurate results even if the quality and quantity of the training examples and/or the feature definition and extraction techniques are carefully employed. Iterative learning allows algorithms to improve model accuracy. During a single iteration flow within a machine learning algorithm, a pre-processed training dataset is first introduced into the model. After processing and model building with the given data, the model is tested, and then the results are matched with the desired result/expected output. The feedback is then returned back to the system for the algorithm to further learn and fine tune its results. This process may be repeated over multiple iterations until the model produces highly accurate results.

As discussed above, a user of system 100 may be responsible for defining the features used to train or implement a model and for configuring example selection (i.e. instructing system 100 on what entities to select, what times feature values should be computed at, and how to sample examples). The user of system 100 may be a data scientist that wants to generate event-based features to train an event-based model. Because the user of system 100, such as a data scientist, understands its own data and the problem that needs to be solved, the user of system 100 may be best equipped to define useful features for training or implementing the model.

According to an aspect, feature computation layer 106 is configured to compute features by performing aggregations across events associated with an entity. Computing features from large amounts of raw data is a technically complicated process, as it may involve computing aggregate properties across all of the raw data. In an embodiment, feature computation layer 106 is configured to compute event-based features by performing temporal aggregations across events associated with an entity. To perform temporal aggregations, feature computation layer 106 produces a feature value at every time, aggregating all of the events that happened up to that particular time. Feature computation layer 106 does not aggregate everything and produce a single value—this would prevent the feature computation layer 106 from determining how the feature value changed over time. It is important that feature vectors and/or examples reflect the real feature values that will be available when applying the model as closely as possible. For this reason, if the model is being applied to "live" feature values (computed over all the events up to that point in time), each feature vectors and/or example should also be computed over the events up to the point in time selected for that example.

In an embodiment, computing each feature includes zero or more temporal aggregations. As described above, temporal aggregations produce a value at each point in time corresponding to the aggregation of events happening at or before that point in time. Because the result of a temporal aggregation is itself a value that changes over time, temporal aggregations may be nested. Nesting temporal aggregations may involve computing the outer aggregate of the result of the inner aggregation at each point in time. When performing nested temporal aggregations, feature computation layer 106 avoids overcounting unchanged values from the inner aggregation. To avoid overcounting, feature computation layer 106 records (for each value) whether it is "new" at each point in time. Aggregations ignore null values and non-new values. A value is new if it is an incoming event, the output of an aggregation that has changed (in response to a new, non-null input) or a value computed from one or more new values.

The aggregation operations used by feature computation layer 106 may be similar to approaches used by other data systems. Specifically, each aggregation may manage an accumulator, and input elements may be added to the accumulator. The output value may be extracted from the accumulator and may reflect the aggregation over all of the inputs that have been added. Any aggregation operation which may be expressed in terms of an accumulator may be used within feature computation layer 106 for computing aggregations. However, while aggregation operations are relatively straightforward, temporal aggregation presents challenges. Specifically, temporal aggregations need to produce an output value at every point in time, and temporal aggregations need to respect (and produce) the "new" indicator.

To provide output values at every point in time, feature computation layer 106 processes events in order. Specifically, two events for the same entity must be processed in order by the associated time. To accomplish this, various ordering and/or partitioning strategies may be implemented, such as by feature computation layer 106. For example, data can be partitioned by entity and sorted by occurrence time within each partition. As discussed above, event-based data is naturally partitioned by entity. If data is partitioned by entity and sorted by occurrence time within each partition, the ordering requirement is satisfied while potentially mixing the order of entities. As another example, data can be partitioned by entity and sorted by both entity and occurrence time. This would also satisfy the ordering requirement, while presenting all events impacting an entity in the same order. As another example, data can be partitioned by entity and divided into batches by occurrence time. Within each batch any valid ordering can be used. Feature computation layer 106 can use any ordering meeting this condition and can use different orderings for different situations. Some ordering may be more amenable to generating training examples over large amounts of historic data while another ordering may be preferred when computing the latest values for production.

The data may be correctly ordered before entering event ingestion module 104, or it may be unordered (requiring event ingestion module 104 to sort the data before processing) or the data may be in multiple ordered parts (requiring event ingestion module 104 to merge the input before processing.) If the data for each entity is processed in order by time, producing the temporal aggregation consists of adding the input at each point to the accumulator and producing the output at that point in time. To respect the "new" indicator, aggregations ignore inputs which aren't new. While an aggregation (conceptually) produces an output value for each time, it is only marked as "new" if there was a new input added to the accumulator at that point in time. This ensures the aggregation correctly produces the "new" indicator. By contrast, other operations need to propagate the "new" indicator as appropriate. For instance, an operation such as "A+B" produces a new value if either "A" or "B" was new at that point in time.

While temporal aggregations are presented as producing values at every point in time, feature computation layer 106 may determine that the output of an aggregation isn't needed except at specific points in time. In this case, the aggregation only needs to incorporate events occurring between those times, but no output needs to be processed. Additionally, if the aggregation is associative and commutative the events between those times may be processed in any order.

In an embodiment, in addition to aggregations over related events, computing each feature includes zero or more lookups of values computed over other sets of events. For example, if the features are computed over events performed by user entities it may be useful to lookup properties computed from events relating to specific videos. In this case, the features computed from events related to users are "lookup" values computed from events related to videos. This "lookup" operation provides similar capabilities to a join operation.

If feature computation layer 106 is configured to operate over all of the input events for both the primary entity and the foreign entity, feature computation layer 106 could simultaneously compute all the necessary aggregations. While this is conceptually how temporal aggregations with lookups behave, feature computation layer 106 performs this in a partitioned and potentially distributed manner. Without lookups, temporal aggregations may be executed entirely partitioned by entity. When executing temporal joins across multiple partitions, any lookup may request data from any other entity, and therefore any other partition, thus requiring some mechanism for cross-partition communication.

In an embodiment, this cross-partition communication takes the form of requesting the necessary values for a specific entity and time, and then receiving a response containing those values. However, as described earlier, each partition is executing an ordered pass over inputs by time. A partition cannot process a row at a given time until it has received all input for that time—including any requests for lookup values at that time. As such, a naive implementation could require the partitions execute in lockstep. This full synchronization would pose a problem even when communication between partitions was fast, such as executing multiple partitions on a single machine.

Figure 6:
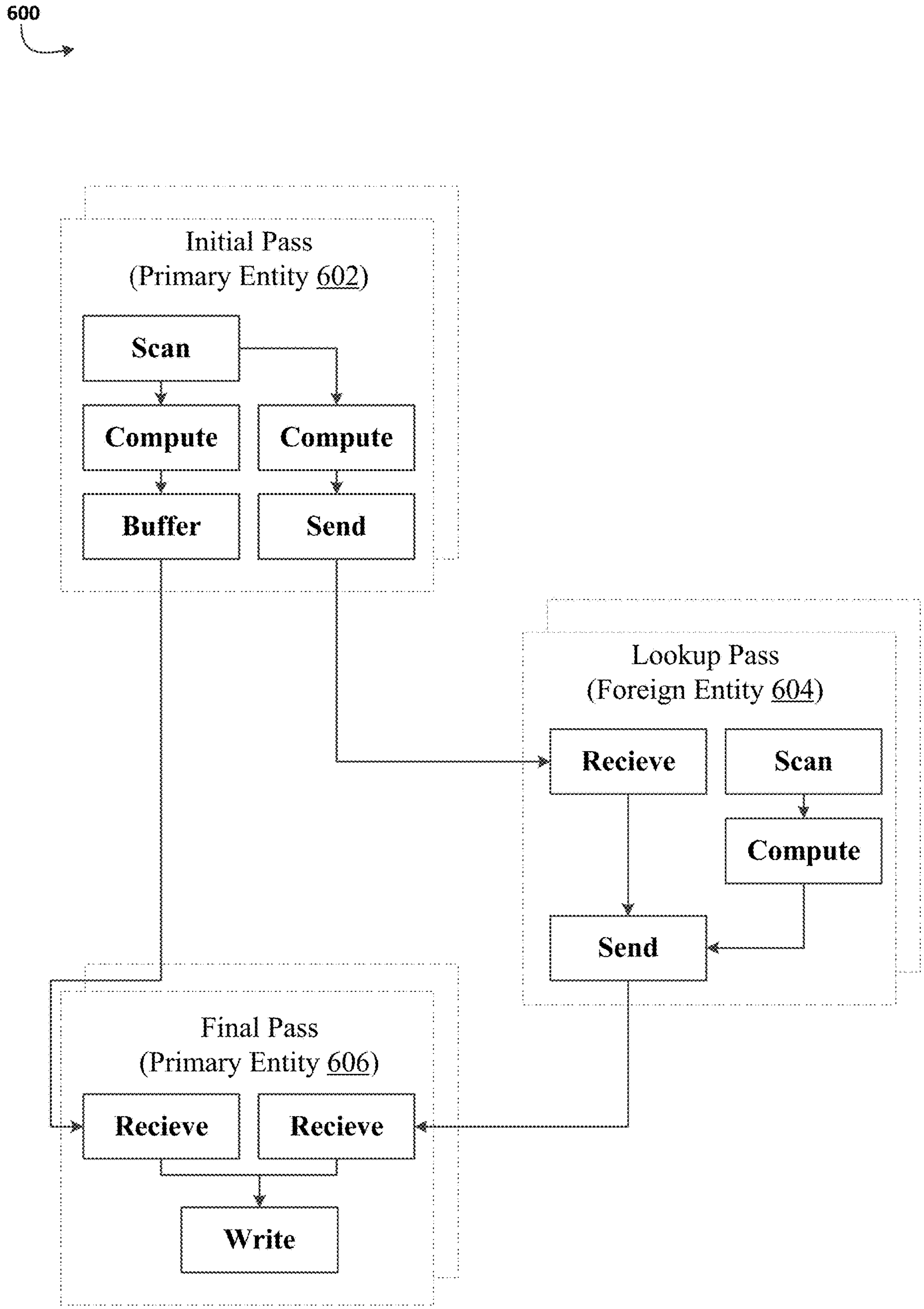
FIG. 6 shows an example aggregation technique including a lookup.

In an embodiment, to reduce the need for synchronization, feature computation layer 106 divides the temporal aggregation plan into multiple passes. FIG. 6 illustrates an exemplary aggregation plan 600 including a lookup. To reduce the need for synchronization, feature computation layer 106 divides the temporal aggregation into three passes. Aggregation plan 600 includes three different passes: an initial pass on a primary entity type 602, a lookup pass on a different, or foreign, entity type 604, and a final pass on the primary entity type 606. The initial pass on primary entity type 602 includes computing the needed keys. The lookup pass on the foreign entity type 604 includes computing the needed values, and the final pass on the primary entity type 606 includes computing the final answers. Each pass corresponds to a (possibly partition) independent pass over the input to the pass ordered by time. A pass only needs to wait for inputs from passes it depends on. Specifically, there is no need for synchronization between partitions of the same pass. In turn, when synchronization is called for (such as receiving all lookup requests prior to processing the foreign entity which can compute the lookup results) the processing is in a pass that depends on the pass producing lookup requests.

As an illustrative example, the primary entity type 602 may be houses and the primary entity instances may be a group of specific houses. The initial pass would be on "houses" while the lookup pass may be on (a) the foreign entity type 604 such as "realtors" or (b) different entity instances (e.g., information of the houses immediately next door to the house the features are being computed for may be looked up).

In an embodiment, in the case of an aggregation without lookups, a single pass is made over the input events producing all the aggregations. In another embodiment, in the case of an aggregation with a single lookup, the initial pass processes input events for the primary entity to determine the lookup values and times that are necessary. A second pass (partitioned and operating over the foreign entity) scans events and computes the necessary lookup results. A final pass collects values computed from both the first pass of the primary entity and the second pass over the foreign entity, merges them (based on time) and outputs the results. Multiple lookups can be accomplished by having additional intermediate passes, the initial and final pass don't need to be duplicated. The ordering requirement (that all input-passes have progressed past a certain time) may be implemented by a simple K-way merge, which combines and sorts all the inputs from each input pass. If an input doesn't produce any output for a period of time, a heart-beat or empty message may be sent allowing the K-way merge to proceed.

According to an aspect, feature computation layer 106 is configured to compute features by performing aggregations across events associated with an entity after performing a lookup. The techniques described above for performing a lookup are sufficient if aggregation is not being performed after the lookup. Specifically, the primary entity may (and is expected) to use aggregation to determine the identity of the foreign entity to lookup from and the foreign entity may (and is expected) to use aggregation to compute the value to return. To implement an aggregation after the lookup, feature computation layer 106 may use existing partial aggregation machinery as for windowed temporal aggregation. For example, existing partial aggregation machinery involves dividing time into a sequence of partial aggregates based on when windows start and/or end and then combining the partial aggregates within specific ranges of time. A lookup may be treated the same way, by dividing time into a sequence of partial aggregates based on when the computed entity key changes (when a given "different entity" is focused on), allowing the given entity to access the partial aggregate of the "different entity" from the time the key changed to that different entity. The time between changes to the lookup key are treated as one or more segments of a window. The outer aggregation includes the partial aggregates of previous keys. Computing the current result includes combining the partial aggregate of previous keys with the partial aggregate of the current key.

As an illustrative example, an expression is "sum(lookup (key, value))." As the value of the key changes over time, the entity selected by the key expression will change as events cause the computed key to change. A naive implementation would need to retrieve the lookup key at every point in time because it would need to update the sum any time a value was received on the foreign entity. Instead, feature computation layer 106 lifts the aggregation into the foreign entity using a strategy similar to partial aggregation of window segments. The foreign entity is "observed" by the primary entity while the value of the key that the primary entity is looking up corresponds to that foreign entity. The foreign entity maintains partial aggregates separated at points where a primary entity started observing the entity. This allows the primary entity to access the partial aggregate of the foreign entity value from when it started observing it to the current time. When the primary entity stops observing a key, it requests the partial aggregate up to that point and includes it in a partial aggregate of previously observed keys and at the same time begins observing the new key. This allows the aggregated lookup value to be computed as the combination of the partial aggregates from the previously observed keys and the current foreign key (from when it started being observed).

According to an aspect, feature computation layer 106 is configured to continuously determine features, such as when feature engine 103 ingests new data from data stream 102. Determining features may include updating features and/or feature vectors, such as based on ingesting new data from data stream 102. The feature computation layer 106 may be configured to compute the features and/or update the features at a speed that supports iteration and exploration of potential features to determine good features for a model. As events continue to be produced and/or ingested the size of the raw data set (e.g., saved to the event store 105) increases over time. As a result of the system's 100 feature determination and updating function, the work needed to compute features does not increase over time and/or as the size of the raw data set increases. The continuous computation of features provides for a more efficient feature engine 103 and enables use of more recent feature values when applying the model.

Determining features may include accessing information outside related event store 105, e.g., by performing lookups from external databases that haven't been ingested by feature engineering system 100. According to another aspect, feature computation layer 106 is configured to determine and/or update features in response to user queries.

Figure 5A:
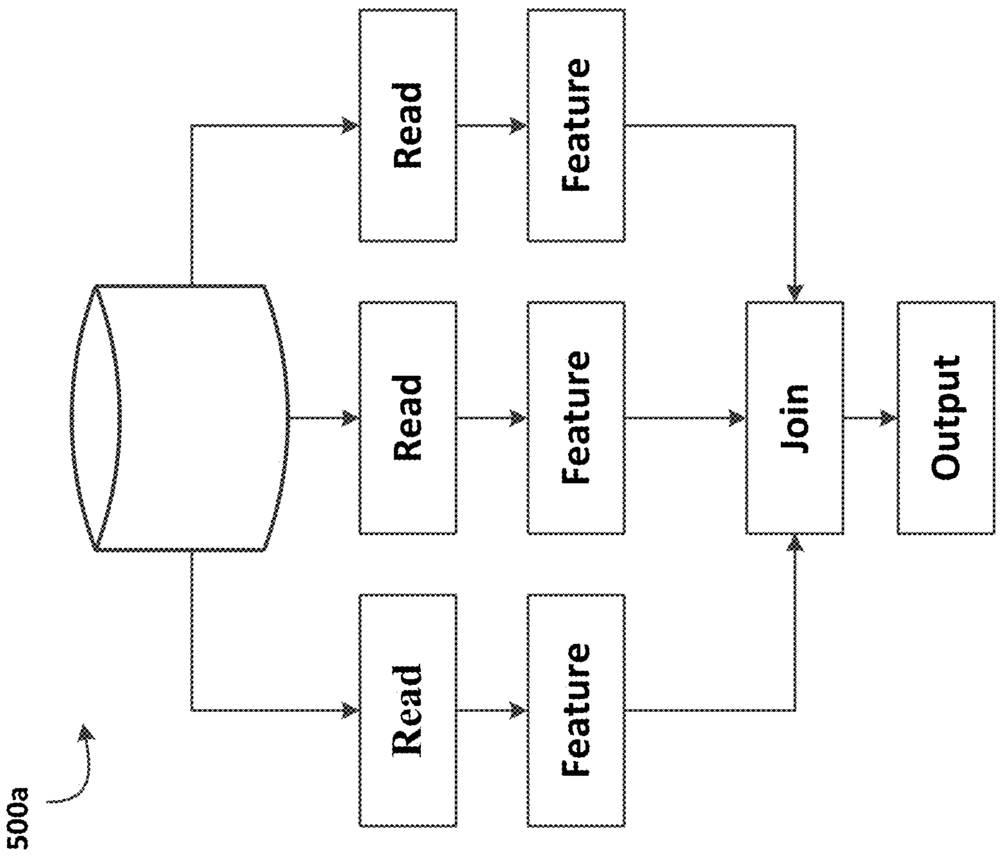
FIGS. 5*a-b* shows example simultaneous feature computations.

According to an aspect, feature computation layer 106 is configured to simultaneously compute more than one feature, such as a large number of features. When simultaneously computing many features, it is possible to compute each feature independently and then join the computed values based on the entity and time. However, this approach is inefficient for at least two major reasons. First, computing each feature may involve retrieving and processing the same input events multiple times. Second, once the features are computed, performing an N-way join is an expensive operation. FIG. 5A illustrates an example N-way join 500*a*, such as a 3-way join, being performed after multiple features are individually computed. Computing two or more of the three features shown in FIG. 5A may involve retrieving and processing the same input events multiple times. After these three features are individually computed, they may be joined and output by the system.

Figure 5B:
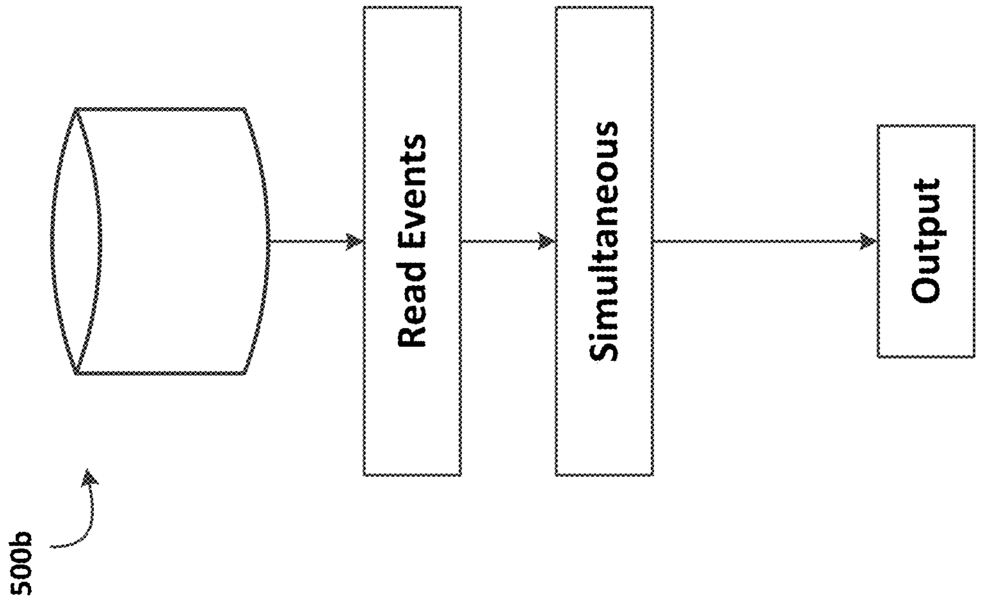

Rather than employing this inefficient and expensive technique for simultaneously computing multiple features, feature computation layer 106 may instead combine all of the aggregations into a single pass over events that computes (at each point in time and for each entity) the value of all aggregations. The description of this flattened operation is called the aggregation plan and the process for producing it is described in more detail below. This flattened aggregation plan allows for the simultaneous computation of the aggregations necessary for all requested features with a single pass over the input, and therefore eliminates the need for the N-way join. FIG. 5B illustrates an example simultaneous feature computation 500*b* without an N-way join. As depicted in FIG. 5B, all of the multiple features are simultaneously computed with a single pass over the input, eliminating the need to retrieve and process the same input events multiple times.

The temporal aggregation of multiple (potentially nested) features can be performed in a variety of orders. In an embodiment, it is row-based. For example, all necessary values at each point in time are computed before proceeding to the next row. In another embodiment, it is column-based. For example, all values in a column are computed before proceeding to other columns that reference the column. In an embodiment, it is a combination of row-based and column-based. For example, the input is divided into batches of rows and columnar computation is used within each batch. The requirement for any execution order is that all values that are inputs to an operation are computed for a specific row before the result of that operation is computed for that row. Any of the three described strategies (and any other strategy meeting this requirement) may be used by feature computation layer 106 while computing feature values. Feature computation layer 106 may choose to use different strategies in different situations.

Regardless of the evaluation order that is used, the resulting row containing the values of all features for a given entity and point in time may be sent to whatever sink is being employed (whether it is collecting statistics for visualization or writing to a file for an export). This row corresponds to the result of the join in the naive approach, without the need to perform an actual join operation. Feature computation layer 106 may discard rows or columns as soon as they are no longer necessary. Once a row has been output to a sink it is no longer necessary. If a column is part of the output, once all rows in the corresponding batch have been output to a sink, the column is no longer necessary. If the column is not part of the output, once all columns that depend on it have been computed it is no longer necessary.

In an embodiment, it may be desirable for feature computation layer 106 to operate on a sample of data. If feature computation layer 106 can operate on a sample of data, quick, approximate answers can be provided in response to interactive queries. To make the sampling informative, complete information for a subset of entities is included, rather than a subset of events for every entity. Without lookups, this sampling can be accomplished by taking only those events related to a subset of the entities. If the events are partitioned by entity, this could be accomplished by considering only a subset of the partitions. With lookups it is necessary to make sure that all events referenced by the sampled primary entities are available. This can be done by computing the lookup keys that the primary entity sample will need (at the selected point(s) in time) and using that set of keys as the sample of foreign entity events. While generating this sample may require filtering events from all partitions, it may be reused as features are changed so long as the definition of the lookup key does not change. In practice, the lookup key tends to change less frequently than other parts of the feature definitions, so this kind of sampling is likely to improve the performance of interactive queries.

In an embodiment, creating a plan for temporal aggregations uses techniques similar to how traditional compilers work. A graph containing operations (called the Data Flow Graph, or DFG) is constructed. These operations include scanning events from a specific entity type, arithmetic, field access, aggregation, etc. Each node in this graph produces a result (a column in the tabular view, a value in the row-based view). During construction of the graph, duplicate operations applied to the same inputs are converted into references to the same output. This avoids redundant computations and corresponds to Common Subexpression Elimination (CSE) as employed in various compilers. Additionally, during construction, operations may be simplified or put into a normal form. These operations may use associativity and commutativity of operations to identify additional equivalent expressions. Operations applied to constants may be eagerly applied (constant folding).

While the techniques described above for creating temporal aggregation plans are well understood, the present system is different in that it is configured to apply these techniques to temporal operations, defining the behavior of temporal operations (including aggregations and tracking of "new" values) such that these techniques are applicable and produce correct results, and converting the result DFG into a schedule consisting of one or more passes to execute. Converting the resulting DFG into a schedule consisting of one or more passes to execute linearizes the DFG by applying a topological ordering. This ensures that dependencies are computed before they are needed. This linearization corresponds to the flattened aggregation plan, allowing all aggregations over the same input to be computed as part of the single pass. Additionally, in the present system, the user-configured time selection may be used when producing plans and executing them to limit the values actually computed. For example, when configured to produce feature vectors and/or examples at points where a specific predicate is true, the resulting aggregation plan needs to evaluate the predicate and update aggregates on every event but only needs to compute the final values and sink them when the predicate evaluates to true.

The techniques discussed above allow feature engineering system 100 to maintain live feature values. Specifically, the techniques discussed above allow feature engine 103 to compute feature values using a partitioned scan over historic events. This allows exporting feature vectors and/or examples computed over the historic data in an efficient manner. Once the feature vectors and/or examples have been produced, feature engine 103 may also be configured to maintain "live" feature values which may be retrieved for a time near the current time for use when applying the model. In an embodiment, this online maintenance is achieved by storing the final accumulator values produced during the export. At any point in time the "new" events may be treated as individual rows or a batch of rows and new accumulators (and feature values) may be produced.

Feature engineering system 100 may simplify collaboration in feature generation and/or selection. As discussed above, features are often defined by users, such as data scientists. A company may have multiple data scientists producing features for one or more models. The data scientists may need to use different tools to access different kinds of raw data and/or events, further complicating the process of producing features. Collaboration on features produced in ad-hoc and varied ways makes it difficult to share features between users and/or projects. In addition, the techniques for producing features may vary based on the data size and the need for producing the feature vectors "in a production environment." This may lead to the need to implement features multiple times for different situations. However, feature engineering system 100 may address these shortcomings by ingesting and/or saving raw data and/or events from a variety of sources and making the features available to users in different locations and/or using different devices, such as via the feature studio described further herein.

In an embodiment, feature computation layer 106 is configured to compute feature vectors. A feature vector is a list of features of an entity. The feature computation layer 106 may be configured to compute and/or update feature vectors as events are ingested by the feature engine 103. The feature computation layer 106 may be configured to compute and/or update feature vectors in response to user queries.

In an embodiment, feature engine 103 includes a feature store 107. Feature computation layer 106 may store the determined features and/or generated feature vectors to feature store 107. Feature store 107 makes deployed features available for users. According to an aspect, feature computation layer 106 keeps feature store 107 up-to-date, such as by computing and updating values of features when new events are received and/or when a request is received from a user. Based on the features stored to feature store 107, feature computation layer 106 may avoid recomputing features using the same events. For example, if feature computation layer 106 has determined features using events up to arrival time x, feature computation layer 106 determines features using events up to arrival time x+n by only considering events that arrived after arrival time x and before arrival time x+n.

According to an aspect, feature computation layer 106 updates the features and/or save the new features to feature store 107. As a result, feature store 107 is configured to make up-to-date query results 113 available on-demand and computed features are readily available for quick model application. A user who wants to use a model trained on a particular exported dataset may efficiently retrieve stored pre-computed values.

Figure 2:
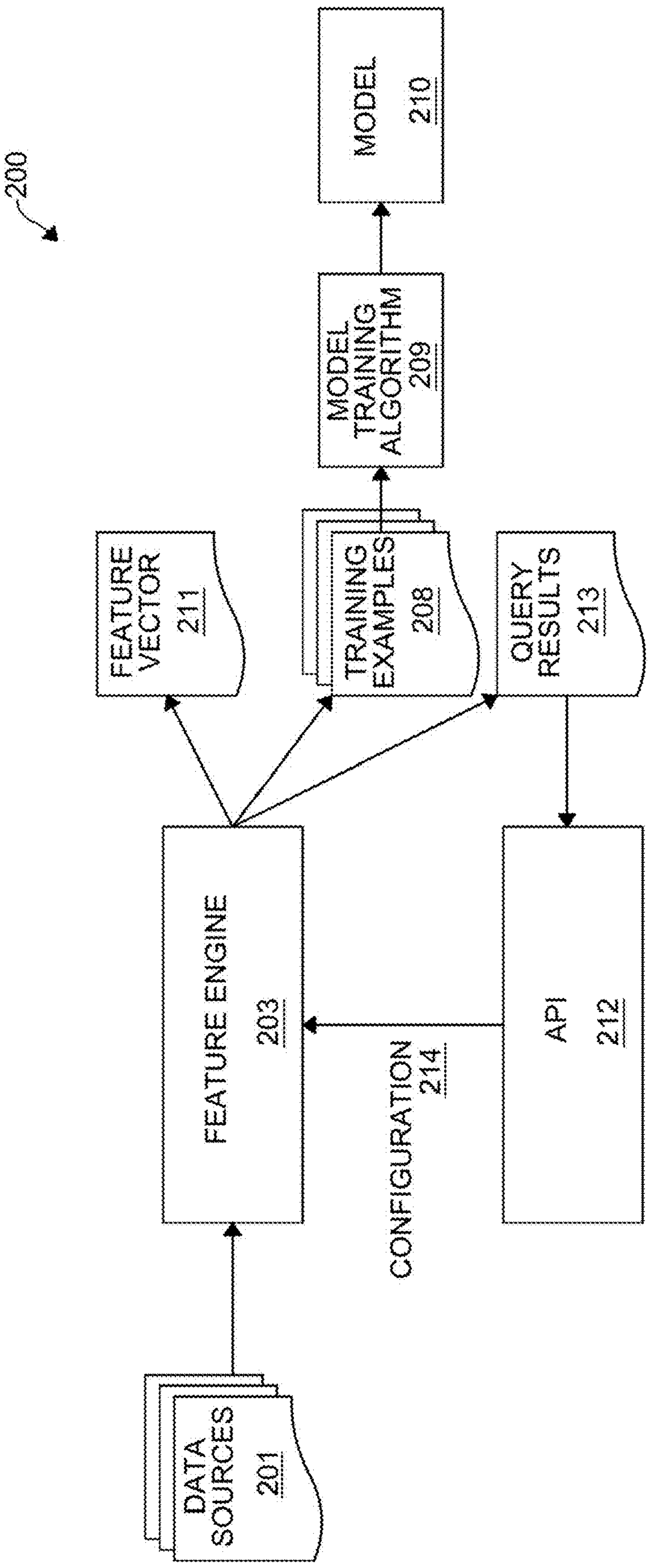
FIG. 2 shows an example feature engineering system in training stage and application stage.

FIG. 2 shows an example feature engineering system 200. System 200 includes one or more data sources 201. Data sources 201 may be similar to data sources 101, 102 in FIG. 1. Data sources 201 may include sources of historical data, data streams, or a combination thereof.

System 200 includes a feature engine 203. Feature engine 203 may be similar to feature engine 103 in FIG. 1. Feature engine 203 may receive data associated with a plurality of entities from data sources 201 and/or a user, such as from a feature studio via an API 212. The feature studio allows users to define features that feature engine 203 will determine using the ingested data and to configure example selection. Because the user of system 200 understands its own data and the problem that needs to be solved, the user of system 200 may be best equipped to instruct feature engine 203 on the manner in which the features should be defined and to configure the example selection. Feature engine 203 may use the received data to generate feature values and feature vectors and/or examples for a machine learning model.

A feature, such as an event-based feature, can be defined by a user via the feature studio using one or more formulas. The formula chosen by the user may depend on the goal that the user is trying to achieve. For example, the user may want to train a model to predict the balance in a checking account at any given time. If "sum(Debit)" is amounts of withdrawals from a checking account associated with an individual and if "sum(Credit)" is amounts of credits to a checking account associated with an individual, a user of feature studio 215 may define a feature "Balance" with the formula "sum(Debit)-sum(Credit)," which adds up the balance of the individual's checking account. If the user instead wants to train a model to predict the average balance in a checking account after each transaction, the user may define the feature as "mean(Balance)." The user may instead want to align the input to a specified sequence of times. For example, if the user wants to train a model to predict the average balance in a checking account each day, the user may define the feature as "mean(Balance each day)." The user may instead want to limit the input to events in a specified time range or window. For example, if the user wants to train a model to predict the average amount of credits in a checking account in the past week, the user may define the feature as "mean(Credit.amount last 7 days)." As another example, if the user wants to train a model to predict the total amount of credits each week, the user may define the feature as "mean(sum(Credit) weekly)." By providing the user with the ability to define features using easy-to-write formulas, the feature engine 203 facilitates the efficient generation of features and eliminates the need for the user to write complex feature-generation code.

Feature engine 203 has functionalities for both the training stage and the application stage of a machine learning process. For the training stage, feature engine 203 is configured to generate training examples 208 to produce the machine learning model. Training examples 208 are generated using the ingested data. In an embodiment, training examples 208 are feature vectors. Training examples 208 are output to the user, such as via API 212 and/or feature studio 215. The user can feed training examples 208 to a model training algorithm 209 to produce a machine learning model 210. Model 210 may be used to make predictions using new and/or different data, e.g., data different from the data of training examples 208. For the application stage, feature engine 203 is configured to generate feature vectors 211, which may be fed to machine learning model 210.

In an embodiment, a user requests a feature vector 211 for a specific entity via the feature studio and/or via API 212. In response to receiving the request for feature vector 211, feature engine 203 generates and/or output feature vector 211, such as via the feature studio and/or via API 212. Generating feature vector 211 may include determining one or more features associated with the entity that make up the feature vector using the ingested data. If the features have already been determined, e.g., before receiving the request, and have been stored, such as to feature store 107 in FIG. 1, feature engine 203 retrieves the stored features associated with the entity and uses the previously determined features and the newly arriving events to generate updated values of the features.

According to an aspect, feature engine 203 determines features using a configuration 214. Configuration 214 may be an algorithm. Configuration 214 may be received from the user, such as via the feature studio and/or API 212. After receiving feature vector 211 from feature engine 203, the user may feed feature vector 211 to machine learning model 210. Machine learning model 210 is configured to use feature vector 211 to make predictions and/or determine information associated with the entity. Machine learning model 210 is configured to output the predictions and/or information via the feature studio and/or API 212.

During the application stage, the user requests a feature vector 211 for an entity, such as a particular person via API 212 and/or the feature studio. For example, feature engine 203 may generate a feature vector 211 comprising a list of movies that the person has watched. Feature engine 203 outputs the feature vector 211 to the user via API 212 and/or the feature studio. The user feeds feature vector 211 to machine learning model 210. Machine learning model 210 predicts one or more movies that the person should watch. The user may use the prediction to provide the person with movie suggestions or for targeted advertising.

In addition to feature vector 211, feature engine 203 is configured to output other query results 213 in response to a user query. For example, other query results 213 may include feature values, statistics, descriptive information, a graph, e.g., a histogram, and/or events associated with one or more entities. According to an aspect, query results 213 are associated with a time specified by the user. According to another aspect, query results 113 are computed using all feature values, a sample of feature values, or aggregated feature values.

In an embodiment, the user interacts with feature engine 203 to update the feature value and/or feature vector 211 computations, such as via the feature studio. For example, the user may indicate a new configuration 214 that should be applied to compute feature values and/or feature vectors 211. As another example, the user may indicate that particular features are no longer necessary, e.g., should not be computed and/or should not be included in feature vectors or computations of query results 213.

Figure 3:
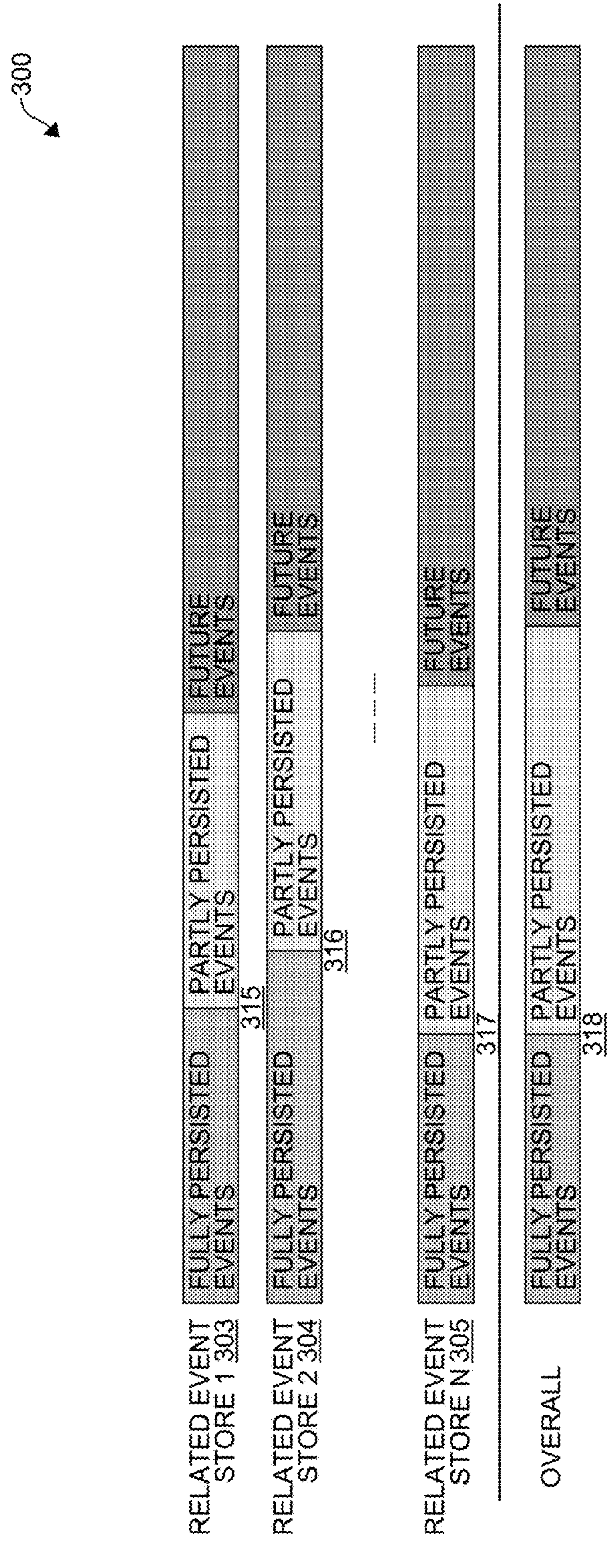
FIG. 3 shows example event data being persisted in related event stores.

FIG. 3 shows example event data 300. In an embodiment, event data 300 is stored in a plurality of related event stores 303, 304, 305. Related event stores 303, 304, 305 may be similar to related event store 105 in FIG. 1. One or more computing devices, e.g., feature engine 103 in FIG. 1, event ingestion module 104 in FIG. 1, and/or feature engine 203 in FIG. 2 may persist, e.g., store, event data 300 to related event stores 303, 304, 305.

According to an aspect, event data 300 is persisted to related event stores 303, 304, 305 at different rates, such as based on network latency and/or processing of the computing devices. As shown in FIG. 3, the rate of event data 300 that has fully persisted, partly persisted, and is being received ("future events") may vary across related event stores 303, 304, 305. Fully persisted events are events that have been persisted to event stores 303, 304, 305. Partly persisted events are events that have been sent to event stores 303, 304, 305, but have not been received, data that is still being ingested by a computing device, and/or data that has been received by related event stores 303, 304, 305 but is not yet persisted. Future events are events that have not been sent to related event stores 303, 304, 305.

In an embodiment, in order to reach consensus on timing of events from event data 300, despite network and/or processing delays, the computing devices store the events to related event stores 303, 304, 305 with associated timestamps. According to an aspect, the timestamps are multipart timestamps, such as the timestamps described in reference to FIG. 2. According to another aspect, the timestamps include arrival timestamps that indicate times that the events were received by the computing devices. The timestamps may be assigned after events are received and before they are persisted. Timestamps may be assigned as soon as possible after arrival of events to ensure that the timestamps accurately indicate the arrival order of events at the computing devices. The timestamps may be similar to the Twitter Snowflake ID and/or the Sonyflake.

In an embodiment, based on the arrival timestamps, the system can avoid recomputing feature values. A feature computation layer, such as feature computation layer 106 in FIG. 1, determines that a feature value with a known arrival time will not change by determining that no events with earlier arrival times will be persisted. Determining that no events with earlier arrival times will be persisted may be performed by causing related event stores 303, 304, 305 to report minimum local arrival times 315, 316, 317 of any not-yet-persisted events and remembering previously reported values of minimum local arrival time 315, 316, 317 of any not-yet-persisted event. The minimum time of minimum local arrival times 315, 316, 327 marks the complete point 318, a time prior to which new data affecting the computed feature values will not be received. The computation layer remembers features that are computed using events with timestamps at and/or prior to complete point 318. Avoiding recomputing of feature values increases the efficiency of feature computation.

According to an aspect, computed features may be stored with an indication of the times at which they were computed. When new events are received, new feature values are computed using a feature value with the latest computation time and/or a feature value with the latest events and the new events.

New events may be received in an order that does not correspond to their occurrence times. In this case, in order to update feature values, the occurrence times of events that arrived after the latest feature value computation time are determined. The minimum occurrence time of the determined occurrence times represents an oldest event of the newly received events. The computed feature value with the largest computation time that is less than or equal to the minimum occurrence time is identified and represents the real point at which to start feature computation. All of the events that occurred after the real point are re-processed. According to an aspect, ordered aggregations are performed using this method applied across feature values and events associated with a specific entity.

According to an aspect of the disclosed subject matter, the arrival timestamps facilitate deploying configuration updates without causing a shut-down of the system. Once a configuration update is deployed, events that persisted after the configuration update was deployed, e.g., have a timestamp later than the deployment time, will be processed using the latest configuration. Events that persisted when and/or prior to the configuration update being deployed, e.g., have a timestamp at or earlier than the deployment time, may have been ingested using an older configuration. Therefore, the events that persisted when and/or prior to the configuration update being deployed are re-processed using the latest configuration.

To determine which events should be re-processed, related event stores 303, 304, 305 reports the arrival time that the latest configuration went into effect. The maximum time of the arrival times serves as a cutoff arrival time. Events having timestamps after the cutoff arrival time are processed with the new configuration. Events having timestamps before this time are not re-processed. Not re-processing events having timestamps before the cutoff arrival time saves time and improves system efficiency.

Figure 4:
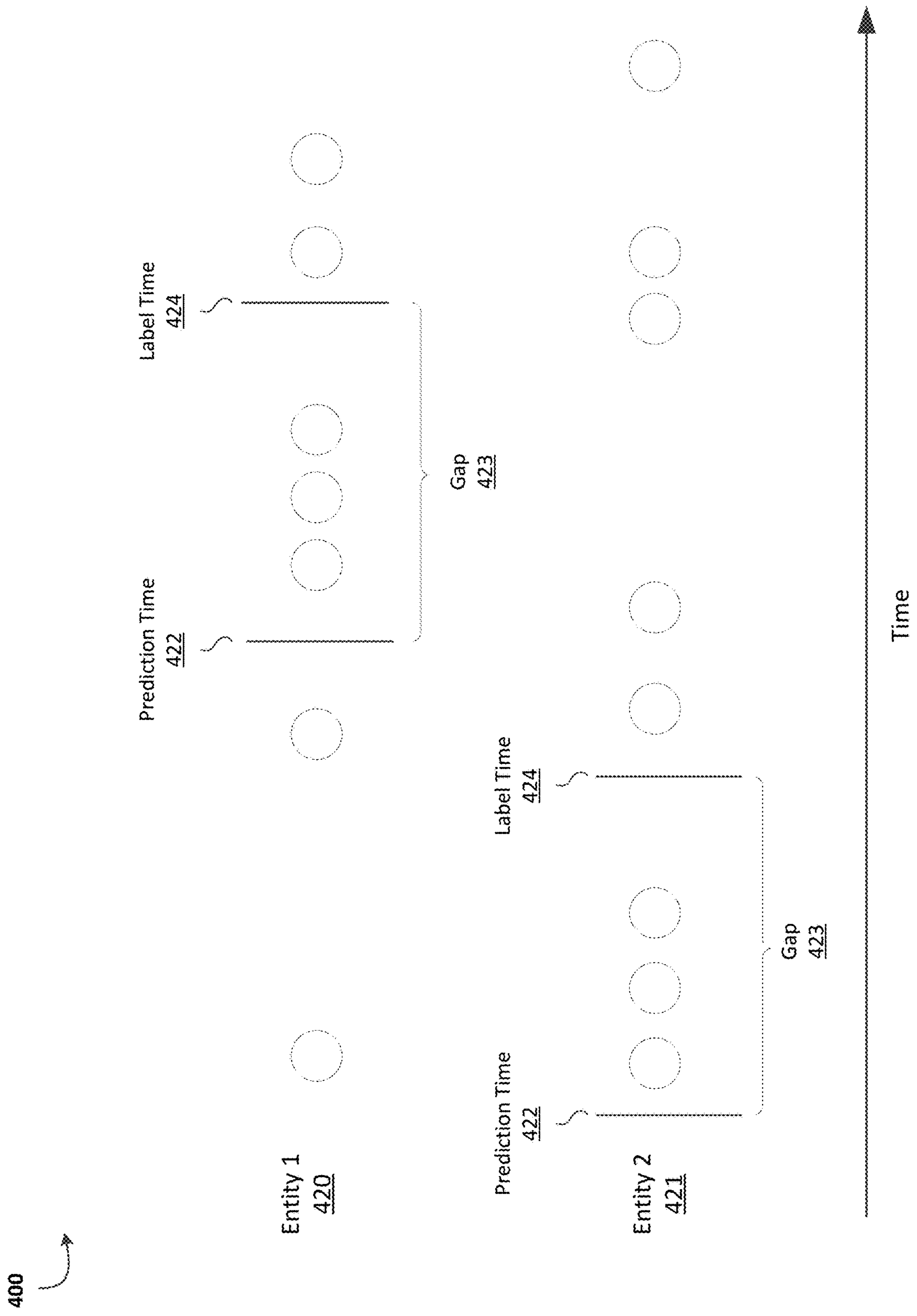
FIG. 4 shows example event data over time.

FIG. 4 shows example events 400 for two entities 420, 421 over time. Events 400 may be events 400 in a dataset ingested by a feature engine, e.g., feature engine 103 in FIG. 1, feature engine 203 in FIG. 2, from a data source, e.g., data sources 101, 102 in FIG. 1, data sources 201 in FIG. 2. According to an aspect, values of features may be determined and/or sampled at arbitrary points in times, such as at prediction times 422 and/or corresponding label times 424, over a continuous domain. The feature values may be determined using events 400 associated with the entity having arrival or occurrence times at prediction times 422 and/or corresponding label times 424.

If data is used to train a model that includes information about the future, leakage may occur. For example, leakage occurs when information that is only available after the event to be predicted has happened are used as the prediction. As an illustrative example, there is a website that has functionalities that are only available to paid users. A model is developed to determine which users are likely to become paid users. However, if the model is trained using information about paid users using the paid functionalities, leakage will result. As a consequence of the leakage, the model can determine that users using the paid functionalities are likely to be paid users but cannot predict which users are likely to become paid users. Accordingly, prediction times 422 and corresponding label times 424 cannot have the same arrival or occurrence times. Otherwise, leakage may occur. To prevent leakage, prediction times 422 and corresponding label times 424 may be separated from each other by some "gap" 423. As the user configures selection of prediction times 422 and label times 424, the length of gap 423 may be determined by the user.

As an illustrative example, events 400 are user activity on a subscription-based service. A user wants to develop and/or apply a model that predicts a likelihood of users cancelling their subscription based on their activity. To generate feature vectors and/or examples, label times 424 are set as times at which users cancelled their subscriptions for the service. Feature values are determined using events 400 having arrival or occurrence times at label times 424. The length of the gap 423, and therefore the prediction times 422, may be dependent on how far in advance the user wants the model to predict the likelihood of users cancelling their subscription based on their activity. For example, if the user wants the model to predict the likelihood of users cancelling their subscription within the next month, the length of the gap may be configured to be one month and the prediction times 422 may occur one month before the label times 424. As another example, if the user wants the model to predict the likelihood of users cancelling their subscription within the next week, the length of the gap may be configured to be one week and the prediction times 422 may occur one week before the label times 424. The feature values at both the label times 424 and the prediction times 422 may be used, in combination, to generate the feature vectors and/or examples.

As described above, prediction times 422 and label times 424 may be determined in any of several ways. For example, configuration of prediction times 422 and label times 424 may be input by a user, such as via API 212 and/or feature studio 215 in FIG. 2. As another example, prediction times 422 and label times 424 may be determined based on a maximum number of prediction times 422 and label times 424. The maximum number of prediction times 422 and label times 424 may be input by a user or determined based on a desired limited number of training examples in a dataset. As another example, prediction times 422 and label times 424 may be defined relative to the occurrence time of events 400 associated with an entity.

If prediction times 422 configurations are input by a user, the user may instruct the feature engine, such as feature engine 103 in FIG. 1 or feature engine 203 in FIG. 2, to select prediction times 422 in a variety of different ways. In an embodiment, the user may instruct the feature engine to select prediction times 422 at fixed times. If prediction times 422 are selected at fixed times, prediction times 422 may occur at a fixed time before label times 424. For example, prediction times 422 may occur a month, three weeks, 24-hours, one-hour, or any other fixed time before label times 242. For example, as discussed above, if an event-based model is to predict whether an individual will quit a subscription service within the next month, then the user may instruct the feature engine to select prediction times 422 at any point-in-time at which an individual is subscribed to the subscription service, and to select label times 424 at the points-in-time one month after respective prediction times 422. In another embodiment, the user may instruct the feature engine to select prediction times 422 when a particular event occurs. If the user instructs the feature engine to select prediction times 422 when a particular event occurs, then selection of prediction times 422 may not be dependent on selection of label times 424. For example, as discussed above, if an event-based model is to predict, when a house is listed for sale, how much that house will eventually sell for, then prediction times 422 may be selected at those points-in-time at which houses are listed for sale. In another embodiment, the user may instruct the feature engine to select prediction times 422 at computed times. For example, if an event-based model is to predict whether a scheduled flight will depart on time, then the user may instruct the feature engine to select prediction times 422 at points-in-time calculated to be one hour before scheduled flight departure times.

Similarly, if configuration of the selection of label times 424 is input by a user, the user may instruct the feature engine to select label times 424 in a variety of different ways. In an embodiment, the user may instruct the feature engine to select label times 424 at fixed times. The fixed time may be, for example, today, or on the $1^{st}$ of a month, or any other fixed time. In another embodiment, the user may instruct the feature engine to select label times 424 at fixed offset times after the prediction times. For example, as discussed above, if an event-based model is to predict whether an individual will quit a subscription service within the next month, the user may instruct the feature engine to select label times 424 at the points-in-time that occur one month after the respective prediction times. In another embodiment, the user may instruct the feature engine to select label times 424 when a particular event occurs. For example, as discussed above, if an event-based model is to predict, when a house is listed for sale, how much that house will eventually sell for, then the user may instruct the feature engine to select label times 424 at those points-in-time at which houses eventually sell. In another embodiment, the user may instruct the feature engine to select label times 424 at computed times. For example, if an event-based model is to predict whether scheduled flights will depart on time, then the user may instruct the feature engine to select label times 424 at points-in-time calculated to be the scheduled departure times.

As another example, prediction times 422 and label times 424 may be selected, such as by the feature engine, to yield desired statistical properties in the resulting feature values. For example, prediction times 422 and label times 424 corresponding to the occurrence of an event 400 may be balanced with prediction times 422 and label times 424 corresponding to non-occurrence of the event 400. By balancing prediction times 422 and label times 424 corresponding to the occurrence of an event 400 may be balanced with prediction times 422 and label times 424 corresponding to non-occurrence of the event 400, a sufficient amount of both positive and negative training examples may be generated. As discussed above, the accuracy with which the model is able to make predictions during implementation may depend on having a sufficient amount of both positive and negative training examples.

As an illustrative example, a model is developed to predict whether customers will sign-up for a service. If all of the training data includes label times 424 with a feature value indicating that a customer signed-up for the service, the model may predict that everyone signs-up, while still being accurate based on the training data. Instead, label times 424 may be selected such that a certain percentage, such as 50%, of the examples include a customer signing up and another percentage, such as 50%, of the examples include a customer not signing up. The examples of a customer not signing up are data from customers who have never signed up. The examples of a customer signing up are data from customers who have signed up and a prediction time 422 is a time being before their signing up. A rule may be created that each customer may only be used for training once.

Figure 7:
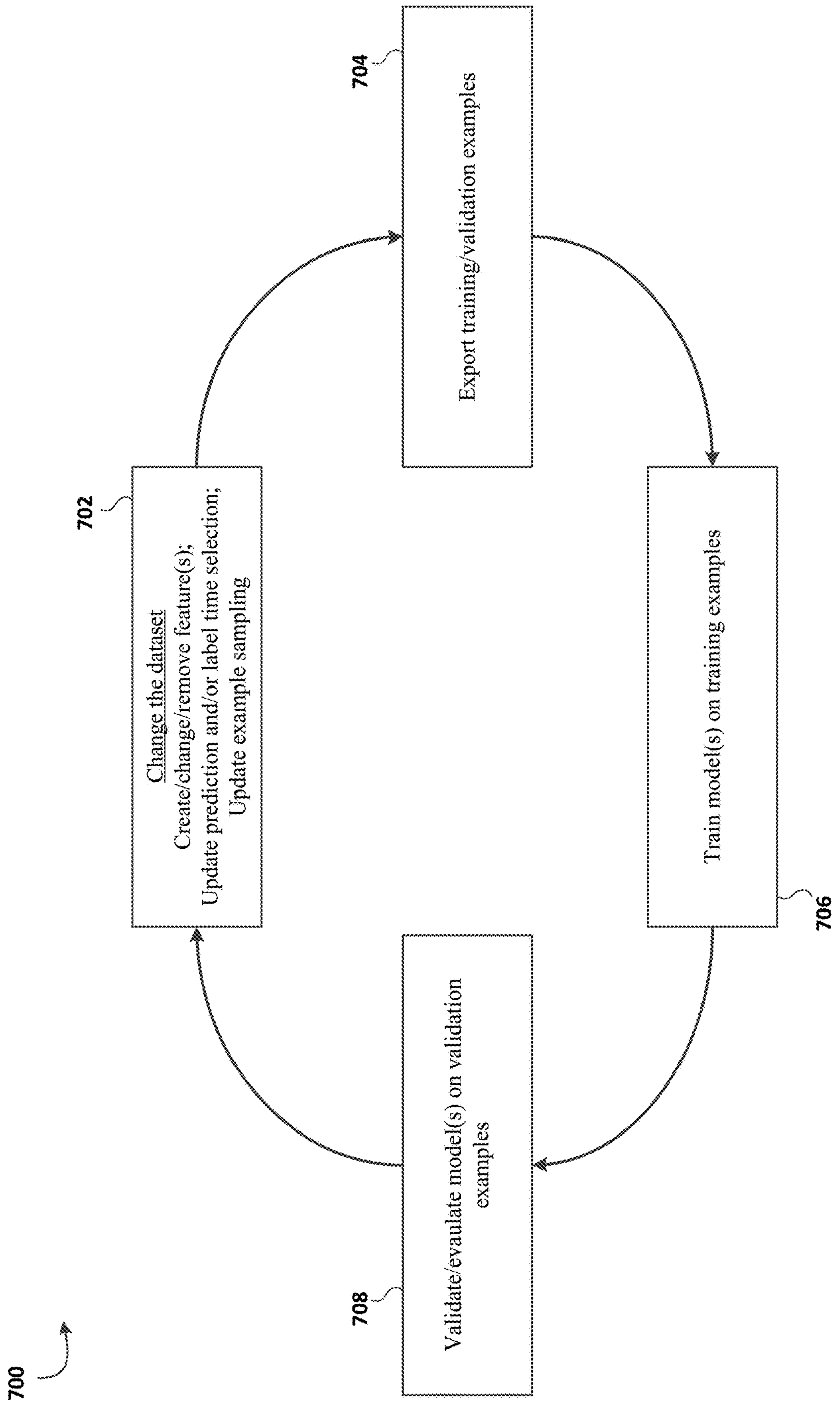
FIG. 7 shows an example model creation method.

As described above, a user of a feature engineering system, such as feature engineering system 100 in FIG. 1 and/or feature engineering system 200 in FIG. 2., is able to define features and configure example selection using a user-friendly interface. The feature engineering system can use this information to efficiently create the desired features and/or feature vectors and/or examples for the user—without the user ever having to write complex code. As discussed above, the accuracy of a model can be improved through an iterative process. FIG. 7 shows an example model creation method 700. The method 700 illustrates the iterative process that the user of the feature engineering system may perform. At 702, the user may define the features and/or configure example selection using a user-friendly interface. If the user has already previously defined the features and/or configured the example selection, the user may change the feature definition and/or example selection configuration at 702. For example, at 702, the user may create, change, and/or remove features. The user may additionally, or alternatively, update prediction and/or label time(s) selection. The user may additionally, or alternatively, update the example sampling configuration.

Once the user has created and/or changed the feature definition and/or example selection, the feature engineering system can use this information to efficiently create the desired features and/or feature vectors and/or examples for the user. For example, the feature engineering system can use this information to create the desired features and/or feature vectors and/or examples for the user by re-using previous computations. After the desired features and/or feature vectors and/or examples have been generated, they may be exported to the user. At 704, the generated features and/or feature vectors and/or examples may be exported to the user. The user may use these exported features and/or feature vectors and/or examples to train and/or validate/evaluate the model. At 706, the user may train the model on any training examples generated by the feature engineering system. At 708, the user may validate and/or evaluate the model using any validation examples generated by the feature engineering system. If the user wants the feature engineering system to generate new or different features and/or feature vectors and/or examples, the user may easily change the dataset being used or experiment with a different dataset. For example, the user may want to try a new dataset to see if the model performs better after being trained with the new dataset. The method 700 may return to step 702, where the user may change the feature definition and/or update the example selection configuration. The user may continue to perform this iterative process until the model is generating results that satisfy the user.

Figure 8:
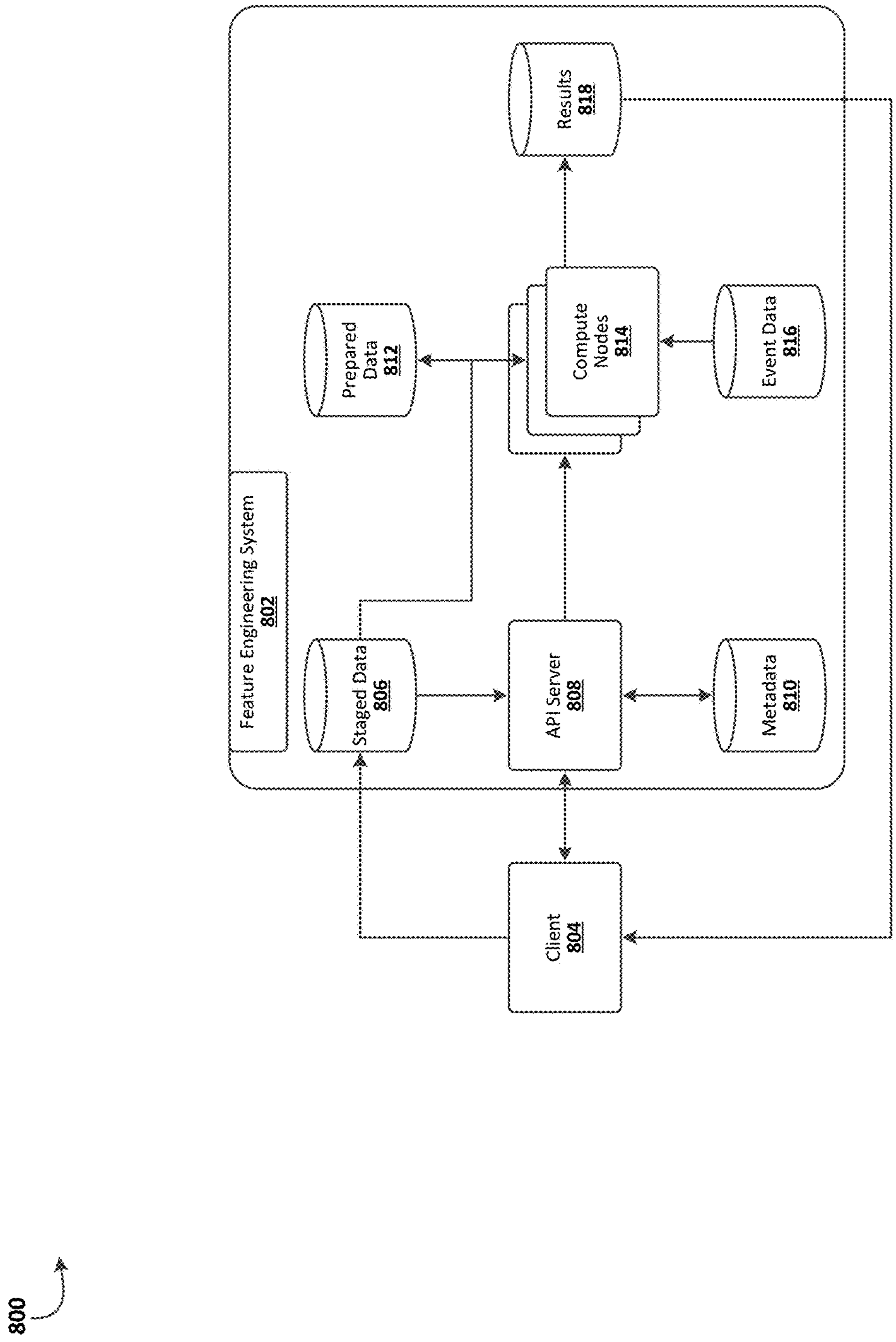
FIG. 8 shows an example network for feature engineering.

FIG. 8 shows an example network 800 for feature engineering. The network 800 includes a feature engineering system 802 and one or more clients 804. System 802 may be similar to and/or perform similar functions as those performed by system 100 and/or system 200 described above. System 802 includes an API Server 808, one or more compute nodes 814, metadata storage 810, event data storage 816, staged data storage 806, prepared data storage 812, and result data storage 818. The event data storage 816, the staged data storage 806, and/or the prepared data storage 812 may utilize an external storage system, such as Amazon S3 or any other external storage system. The compute nodes 814 may be, for example, a feature engine, such as one of the feature engines described above.

API Server 808 exposes the capabilities of system 802 to clients 804 via a variety of API methods. In embodiments, at least some of the API methods facilitate user creation of tables and user management of data files associated with the table. For example, one such API method allows clients 804 to create a new data table. As another example, one such API method allows clients 804 to stage a new data file. This API method may return an upload URL for an external storage system (e.g., Amazon S3) where clients 804 may upload the file. After a file is staged to the external storage system, other API methods may allow clients 804 to add the staged file to an existing data table.

A staged file is a file loaded into the system 802 that is not yet assigned to a table for query use. The file only exists in a "staging" area. In the staging area, information about the file, such as size, schema, row count, may be accessible. A staged file may be added to one or more tables. Adding a staged file to one or more tables does not require an additional upload or require any additional time. This may be helpful as the upload may take a long time and/or fail. By first transferring the file to the staging location and then adding the file to a table, the actual addition may be faster and less likely to fail and possibly atomic. Additionally, the file only needs to be uploaded once. Files uploaded to the staging area may be retained forever or for some period of time configured by a time to live (TTL).

In embodiments, in addition to updating the metadata in metadata storage 810, such an API method also verifies that the staged file is compatible with the table definition and/or prepares the data file for use with the table. Verifying that the staged file is compatible with the table definition and/or preparing the data file for use with the table may include verifying that the file is compatible with the table schema. Verifying that the file is compatible with the table schema may include sorting the file based on the ordering properties specified with the table. Sorting the file based on the ordering properties specified with the table may include copying the prepared file into a separate location corresponding to the event data (i.e., event data storage 816). This may include combining, slicing, or partitioning the data, as well as any other form of changing the data and/or moving it between files.

In embodiments, some of the API methods allow clients 804 to connect one or more event streams to tables. System 802 may add events to event data storage 816 as quickly as events arrive on the stream. System 802 may collect batches of events to add to event data storage 816. This may be handled similarly to how a new data file is added to the table. System 802 may rely on queueing within the event stream to retrieve batches of events and add to event data storage 816.

In embodiments, some of the API methods facilitate user issuance of a query over one or more data tables. API Server 808 sends the query and any necessary metadata associated with the tables (e.g., metadata stored in metadata storage 810) being queried to compute nodes 814 for processing. Compute nodes 814 retrieve the necessary event data from event data storage 816 to produce the results for storage in result data storage 818. Depending on the configuration of the request, the results may be written to an external file store and/or returned as part of the query. Query results may also be written to a variety of existing feature stores (e.g., feature stores provided by Redis or Tecton).

The metadata may indicate which files are part of the data tables. The metadata may describe properties of each file, including the schema, minimum and maximum time represented within the file, or statistics such as which entities are present within the file. The metadata may describe properties of the table determined from the set of files, such as the combined schema. The metadata may store user-provided information, such as a description of the table or the user which created the table. Not all of the metadata may be needed for querying. For instance, only the combined schema of the table may be necessary. Other information (such as minimum and maximum time within each file) may allow the query to read a subset of the files, improving performance. Other information (such as the description) may not be used (or sent) at all as part of a query.

In embodiments, some of the API methods allow clients 804 to request materialization of a specific query to a destination. The destination may be a feature store such as Redis or Tecton. Materializing a query may run immediately over the existing files to initialize the results. Afterwards, the results are periodically updated on a schedule and/or in response to the addition of new files to the table(s) involved in the query. Such a materialization may be useful for serving the latest values of the feature values for applying a model.

Because the system 802 facilitates both on-demand queries and maintenance of materializations, the system 802 addresses a variety of use cases. One such use case includes interactively querying the system 802 during the development of new features. Another such use case includes querying the system 802 for training examples at multiple points in time in the past when training a model. Another such use case is materializing (and maintaining) the latest feature vectors for serving features and applying the trained model. Addressing both of these use cases in a single system (e.g., system 802) enables the development of a machine learning model and allows it to be brought into production with a single mechanism for both describing and computing features.

In embodiments, client libraries may provide wrappers around API Server 808 that are suited for use with specific libraries and languages. For example, a Python client library may provide for interoperability with existing data science tools (e.g., Pandas, NumPy, etc.). Such a client library may provide interfaces that interact with such a data science tool, for instance, taking a Pandas data frame and adding it to a file, using the methods of API Server 808. Client libraries may allow multiple users of the system to each work with familiar tools built around the common Feature Engineering System. By providing a common way of defining and computing features between these different libraries and use cases, system 802 enables multiple users to collaborate with each other throughout all the steps and the variety of tools involved in developing a model and bringing it to production.

In embodiments, system 802 provides a data token indicating a specific state of the system. This token may reflect the tables that have been created. This token may reflect which files have been added to the tables. The query API method may allow clients 804 to specify a specific data token at which to perform the query. The results may correspond to the table definitions and contained files corresponding to the given data token. This may be useful to reproduce earlier results for verification, debugging, and/or a variety of other purposes. If clients 804 do not specify a data token in the query, system 802 may treat that as equivalent to a query with a specified data token using the latest data token. This may correspond to the latest set of data.

Figure 9:
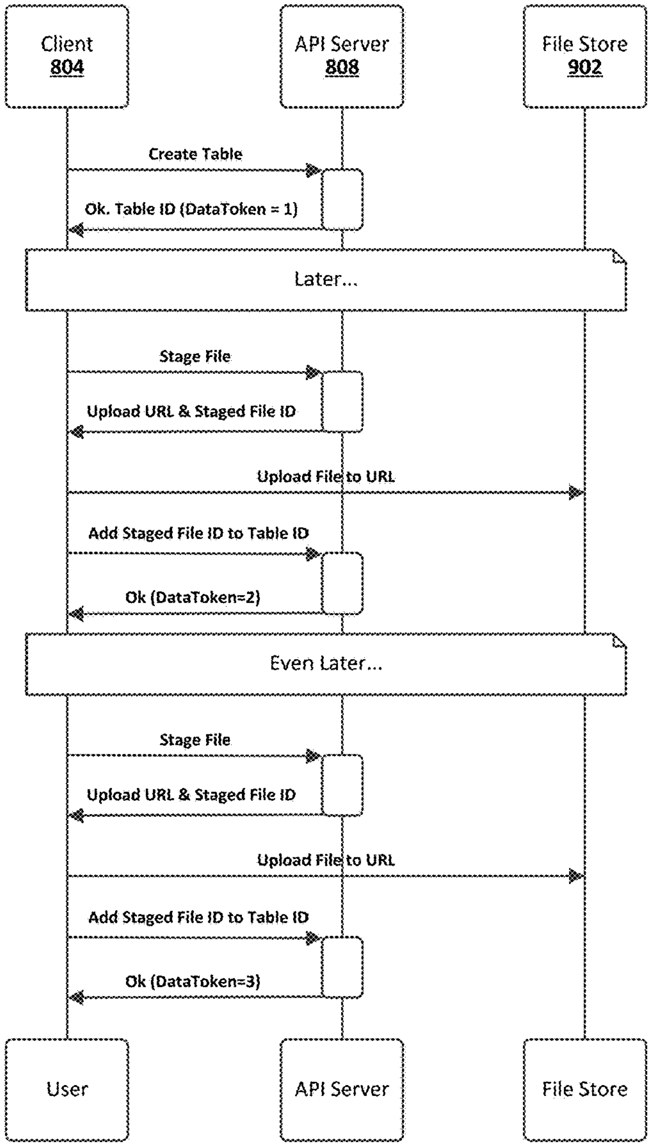
FIG. 9 shows an example diagram depicting file staging.

FIG. 9 shows an example diagram 900 illustrating a sequence of operations between clients 804, API Server 808, and a file store 902 to create a table and then stage and add two files to the created table. The updated data token may be returned from API server 808 in response to calls that changed the state of the data in the system. The data token may be an increasing number as shown in FIG. 9. The data token may be a random token produced by API server 808. The data token may indicate new data in a table. The data token may change when other tables are created or modified.

In embodiments, clients 804 are able to assign names or other metadata to specific data tokens. For example, clients 804 may assign a date-based name after loading multiple files corresponding to a day. Then, when querying, clients 804 can use the assigned name of the data token instead of its ID. This may be useful, for example, when one client is responsible for loading the data files from each day, and a different client is later querying those data files.

Referring back to FIG. 8, in embodiments, system 802 allows clients 804 to define one or more ways to slice the data. Data slices may be used to select a specified subset of entities. For example, data slices may be used when focusing on one or a few entities in order to examine the related data in detail. This may result in significantly faster queries. Additionally, or alternatively, as only the events for the selected entities are being processed, it may be easier for clients 804 to understand the events because they are focusing on the values for one or a few entities changing over time in response to events.

In embodiments, the selection of entities for a data slice may use computed values. For example, slicing the subset of entities in a specific county may require computing the county from the zip code associated with the entity. Data slices may be used to filter a specified subset of events. This may be used when only certain types of events are useful for computing features. Filtering them out as part of creating the data slice allows each query to operate only on the relevant events. The filtering of events may rely on computed values. For example, only those events that occurred within a specified region may be relevant. Determining the region from the information in an event may require computation.

In embodiments, data slices may be used to select a random or pseudo-random sample of the entities. This may be used when iterating on feature engineering to reduce the total data set size being queried. This is more ideal than a solution that just takes a random sample of the events, because each of the selected entities has a complete set of events. Because each of the selected entities has a complete set of events, the feature values computed for them would be the same for the sampled data slice and on the entire data set. The selection of a random sample may use computed values. For instance, a sample of 1000 entities that are representatively distributed by age group may be requested by configuring a data slice that is sampled proportionally to the age groups in the entire data set. If a given age group represents 20% of the data, then there would be 200 entities in the produced sample.

In embodiments, data slices may divide the entire data set into a set of disjoint (non-overlapping) data slices. Individual slices may be queried directly. Multiple (or all) slices may be queried in parallel across one or more compute nodes by issuing a separate query for each partition.

In embodiments, the system 802 prepares data prior to executing a query. Data preparation may occur in one or more passes for each file. An output file from one pass may be used to produce one or more outputs on subsequent passes. Data preparation may prepare the same input multiple different ways to support different queries. For example, data may be prepared differently for queries using different slices. Data preparation may be associated with a version and/or other metadata. Such metadata may be used to identify different prepared data sets. The preparation version may be used for identifying the need to re-prepare data.

Data preparation may normalize the file format by converting it to the format that query expects. Data preparation may provide default values for columns by replacing null values with a specified value. Data preparation may combine the data from a large number of files into a smaller number of files. Doing so may eliminate the overhead associated with the extra files. Data preparation may split the data from a small number of files into a larger number of files. Doing so may allow queries to skip entire files if they are determined to be irrelevant. Spreading the data into a larger number of files means that there is less data in each file, so it is more likely that an entire file will be unnecessary. Splitting the data based on time ranges may eliminate overlapping time, which allows the files to be processed in order rather than being merged.

Data preparation may reorder the data within files. Doing so may allow queries to process events in order by reading from the reordered files without a need to sort them. Data preparation may filter the data in files. Such filtering may be done when a Data Slice indicates only certain events are necessary. Filtering the data during the preparation process allows the query to read less data which may be significantly faster than reading everything and discarding unnecessary events. A user may filter events from a specified region to examine local behaviors. A user may filter to a single entity to zoom into the events and computed features over time for that entity. Data preparation may add columns to the data as necessary for processing. Data Preparation may convert the types of columns, for instance converting a string to a corresponding numeric type or date-time representation. Data preparation may apply 0 or more different preparation actions. Preparation actions may be requested by the user to make the input data easier to work with. For example, cleaning messy data by normalizing capitalization or filling in null values with defaults. Preparation actions may be performed to enable faster queries. For instance, sorting the data during preparation allows the query to assume the input is sorted rather than re-sorting it.

Data preparation may be parallelized differently from query. For example, it may be distributed across files rather than partitions of the data set. Data preparation may be reused between queries. For instance, prepared files may be cached so that files are prepared once and queried many times. Data preparation may happen any time after a file is added to a table and before the query is actually performed. This may happen immediately when the file is added, to allow queries to start immediately. This may happen just before a query begins, in which case the first query after the file is added may need to wait for the prepare to complete. This may happen while the query is executing before the prepared file is needed. This may happen at any time in between.

In embodiments, completed queries provide a resume token indicating the query and results that were returned. A later query may be performed using the same resume token to get results which have changed since that resume token. The later query may use a data token to get the results changed since the previous query and the given data token. The later query may omit the data token (in which case the system will use the latest data token, corresponding to "now"). This process may be repeated multiple times. For example, each time a new resume token is returned it may be used in a later query to get results since the query which returned that token.

Queries for the results since a previous resume token may return significantly smaller sets of results than a complete query. Rows which were previously returned may be omitted. Rows with values that have not changed since they were previously returned may also be omitted. This smaller result size may be faster to load into a storage system for serving feature values. Queries for the results since a previous page token may additionally, or alternatively, require significantly less compute time. This may be accomplished by storing intermediate states from the previous computation reflecting some or all of the events previously processed. When a query with a resume token is received, the intermediate state(s) from an earlier query may be used instead of reprocessing the corresponding events. This may allow the query to process only the new input since the previous query, rather than all of the input. In long running systems, it may quickly be the case that all previously accumulated data is significantly larger than the data arriving in any time interval, so this will often significantly speed up the queries.

Figure 10:
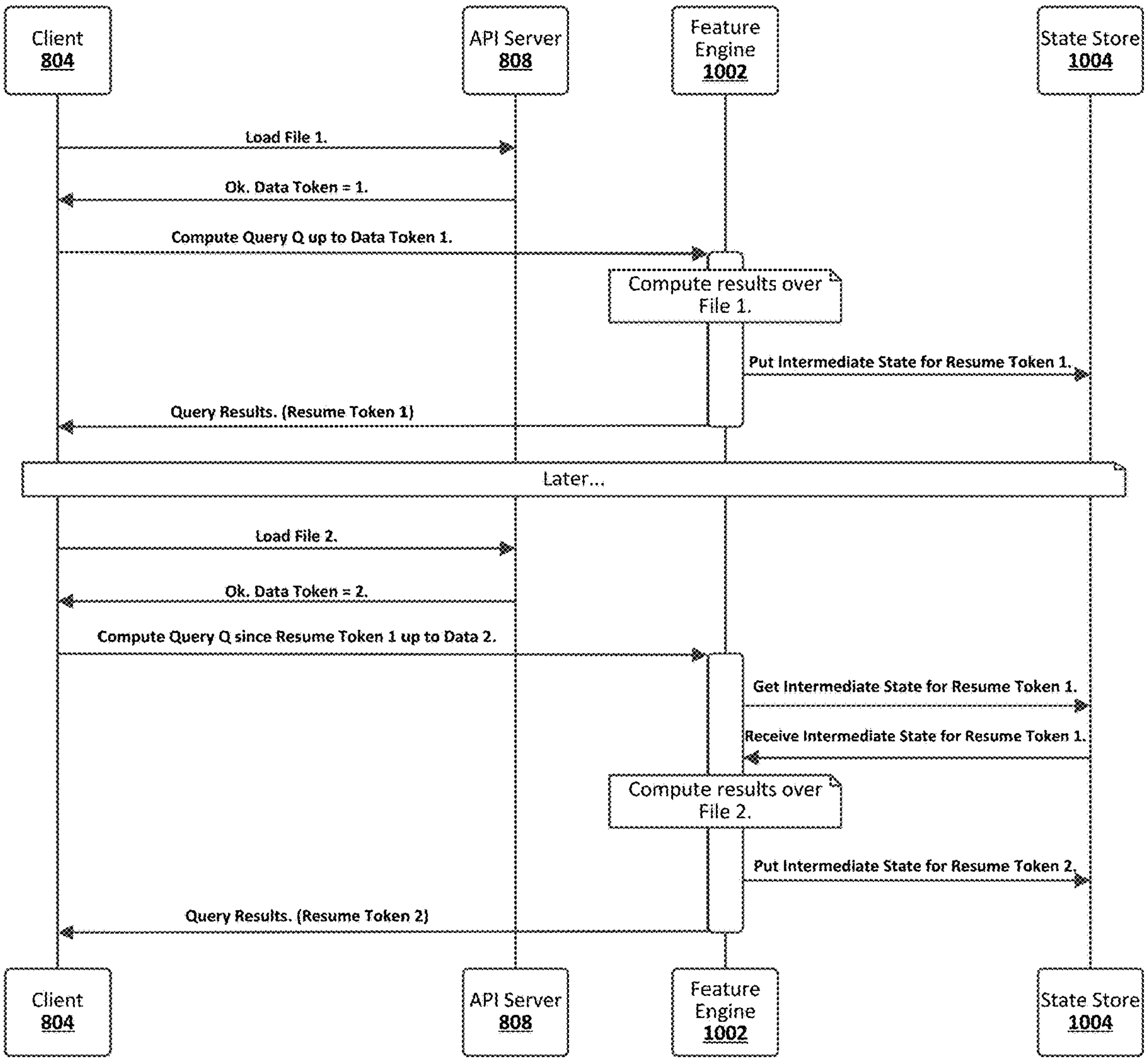
FIG. 10 shows an example diagram depicting resumable queries.

FIG. 10 shows an example diagram 1000 illustrating the use of resume tokens and resumable queries. The second query uses a resume token and receives the intermediate state for resume token 1 from a state store 1004. Afterwards, it only needs to compute results over the contents of File 2.

The use of state is similar to memorizing the state of the accumulators within the feature engine 1002.

Resumable queries may ensure that the query used with a resume token matches the original query that produced the resume token. Doing so ensures that the intermediate state is compatible with the query being performed. Resumable queries may store the query as part of the resume token. Doing so allows the next set of results to be requested with only the resume token. Resumable queries may be used to page over results. In this usage they are similar to systems with a single snapshot. After the previous query, the state is a snapshot and that is used to start the next query. Such usage and systems may only support retrieving the next page if the new data contains no late data. Resumable queries may support more general usage than systems with a single snapshot. The resume token from any previous query may be used for multiple queries. This may allow requesting results which have changed since any previous resume token. This may allow using a resume token from earlier than the immediately preceding request, so that all new data occurs after the intermediate states that are stored in the earlier token.

Referring back to FIG. 8, in embodiments, there may be an arbitrary delay between when an event happened ("occurrence time") and when it has been loaded into the feature engine and processed ("arrival time"). Events may be delayed due to network connectivity. Events may be delayed due to batching and periodic scheduling at various points. Events may be delayed for various other reasons.

Figure 11:
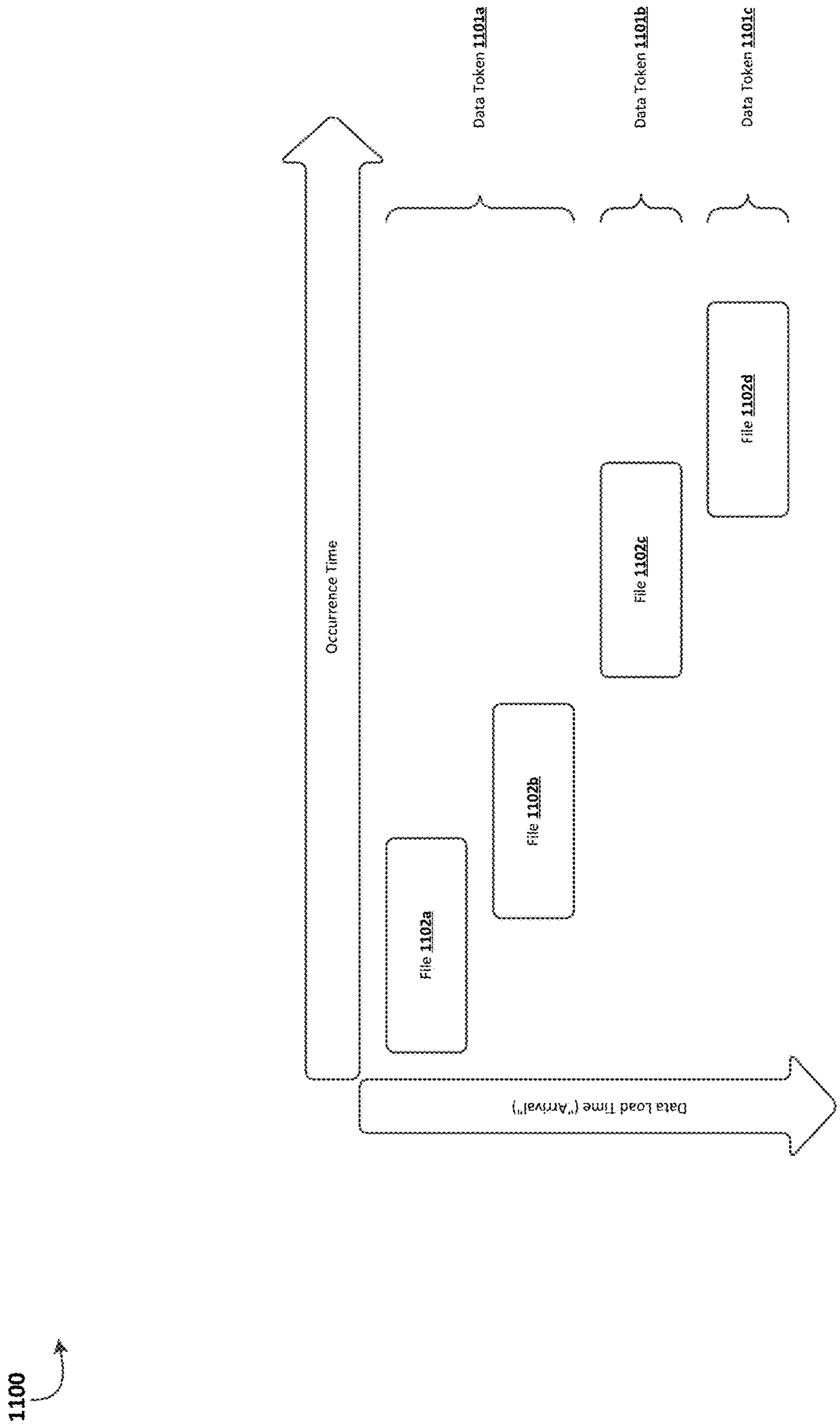
FIG. 11 shows an example diagram depicting late data and resumable queries.

FIG. 11 shows a diagram 1100 illustrating a possible sequence of data tokens 1101*a-c* as files 1102*a-d* are added to a table. Each file 1102*a-d* shows the range of times associated with events in the file. Each data token 1101*a*0*c* may correspond to zero or more additional files in a predetermined table. Here the data files 1102*a* and 1102*b* are loaded simultaneously, producing data token 1101*a*. At some later time, data file 1102*c* is loaded, producing data token 1101*b*. In this case, there is no overlap with previously loaded files. At some later time, data file 1102*d* is loaded, producing data token 1101*c*. In this case, there is overlap between the times included in data file 1102*c* and the times included in data file 1102*d*.

Referring back to FIG. 8, system 802 may process events as soon as they are available. Doing so produces new values as well as new intermediate states. These states may be memorized as part of resumable queries. The system may store multiple previous intermediate states associated with different data tokens and points in event time. Storing multiple intermediate states increases the chance that one of the intermediate states will be applicable.

In embodiments, system 802 may process all late data regardless of actual delay. Doing so in a resumable query may use any eligible intermediate state. An intermediate state is eligible if the latest event it includes is before the earliest new event. Resuming computation from such a state ensures events are processed in order, since no events later than any of the new events have yet been processed. The best eligible intermediate state may be the one that minimizes the number of events that need to be processed. The best eligible intermediate state may be determined by choosing the state with the maximum event time less than the latest new data point.

Figure 12:
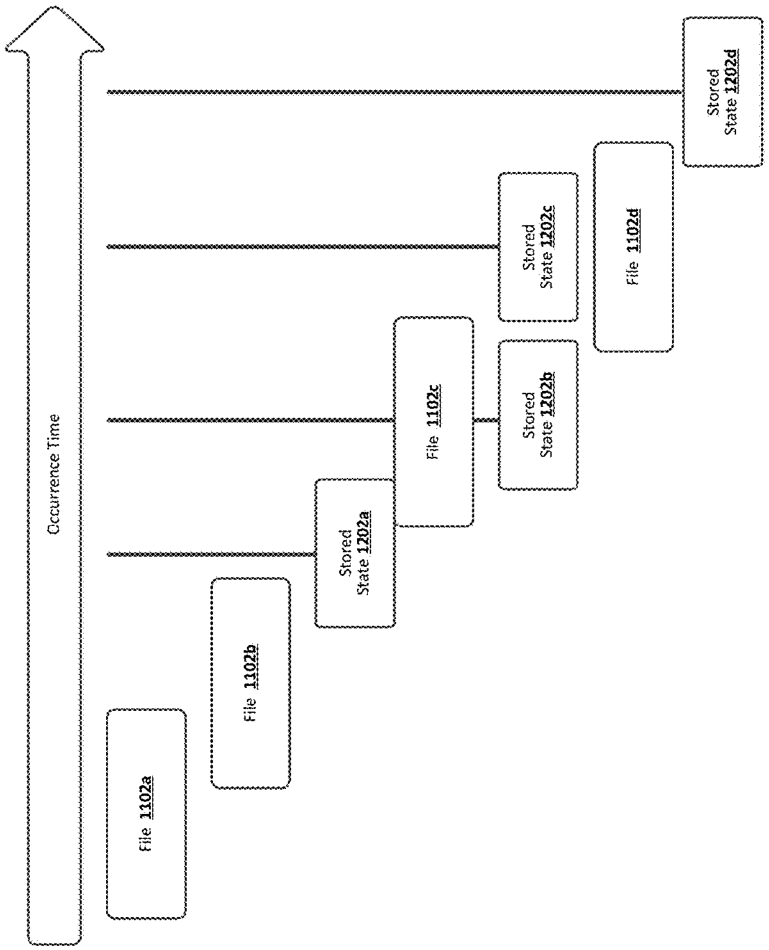
FIG. 12 shows an example diagram depicting stored states.

FIG. 12 shows a diagram 1200 illustrating the rules used in the selection of which intermediate states are usable by subsequent queries. After first data file 1102*a* and second data file 1102*b* were loaded, a query was issued which led to a single stored stage (i.e., first stored state 1202*a*) being produced. First stored state 1202*a* reflects all of the events in first data file 1102*a* and second data file 1102*b*. When a query including third data file 1102*c* is received, the system is able to reuse first stored state 1202*a* because (a) all of the previous files have been included in that state and (b) no events from third data file 1102*c* invalidate any of the results in first stored state 1202*a*. Results would be invalidated if third data file 1102*c* had events that occurred before events from first data file 1102*a* or second data file 1102*b*.

While the query including third data file 1102*c* is processed, it produces two more stored states (i.e., second stored state 1202*b* and second stored state 1202*c*). Second stored state 1202*b* is produced part way through the computation and third stored state 1202*c* is produced after all of the events in third data file 1102*c* are processed. If a later query is received that includes fourth data file 1102*d*, both first stored state 1202*a* and second stored state 1202*b* are eligible. The system cannot use third stored state 1202*c* because it contains data derived from third data file 1102*c* which may be invalidated by events in fourth data file 1102*d*. The feature engine may select second stored state 1202*b* for use because it includes the most previous data. This would require reprocessing only those events from third data file 1102*c* that occurred after second stored state 1202*b* and all the events from fourth data file 1102*d*. The feature engine may also choose to use first stored state 1202*a*. This would require processing all of third data file 1102*c* and fourth data file 1102*d*.

Referring back to FIG. 8, the ability of the system 802 to handle late data while immediately producing results reflecting all received events and its ability to resume computations with minimal need to reprocess prior events are important for handling late data. As an example, many stream processing systems assume that late data may be bounded. Such stream processing systems may require users to configure a maximum expected delay and/or may only process events older than this maximum delay. They may discard any events that exceed the maximum lateness. All of these are undesirable features that the system 802 remedies.

In embodiments, materializing the latest values for each key to a feature store may be useful for operating a model in production. The feature store serves the computed feature vector for each entity that the model may be applied to. To ensure the latest values are materialized in a timely manner, it may be useful to incrementally materialize them. This may make use of resumable queries, as described above. The feature store is initialized with the results of a query. Subsequently, the feature store may be updated by resuming from the previous query and getting only those values which have changed. Each following update resumes from the previous query.

The use of resumable queries allows incremental materialization to process only the events that have arrived since the previous materialization. There may be many fewer newly arrived events than total events. Incremental materialization may manage the use of resumable queries by storing the resume token internally. Each time the incremental materialization issues a query request it may use the previously stored resume token. Each time the incremental materialization receives a query response it may update the stored resume token. A history of resume tokens may be stored instead of a single previous resume token. Incremental materialization may associate the additional state with a data token. Then materializing the results from a previous data token up to a new data token consists of determining the files that are "new" since the previous data token and using the compute nodes 814 to produce updated results reflecting the additional data.

Thus, the system 802 may be able to immediately produce results over all data contained in a specific data token and may be able to use a corresponding resume token and a later data token to get updated results. As a result, the initial query does not need to delay or omit any data in case later data arrives. Additionally, the latter query for updated results needs to reprocess only a minimal amount of data.

For example, an application may produce 1000 events a day and may have ten years of historic information already loaded. Performing a query over all of the historic information may require the processing of a large quantity of events. For example, performing a query over all of the historic information may require processing 3,650,000 events (10*365*1000=3,650,000). However, if the system 802 uses a resume token to update the values after an additional day, only 1000 new events need to be processed. Many applications produce many orders of magnitude more than 1000 events per day. For such applications, the ability of the system 802 to only process the new events is particularly important.

In embodiments, resume tokens are utilized to continually apply the results of a query to a separate (i.e., external) data store with minimal cost. This may be achieved by first running an initial query, writing the results to the separate data store, and receiving a resume token. A query may be periodically run to update the results in the external store. Each query uses the resume token returned by the previous response. The new results may reflect only those results which have changed.

In embodiments, the ability of the system 802 to persist the state of computations using resume tokens has benefits when computation is interrupted. For example, computation may be interrupted due to a system failure or planned system restart. If computation is interrupted, the system 802 may resume the query from the last state reported prior to the interruption.

In embodiments, the system 802 may be configured to perform temporally correct joins, such as with foreign entities. A value at a point in time is temporally correct if it includes all of the events up to (and including) that point in time and none of the events after that point in time. The result of any computation may thus be a sequence of values corresponding to the temporally correct value at each point in time. By contrast, many other data processing systems instead operate on all of the data (events) in the system. This may result in the correct values at a time after all of the events. However, due to delays that occur between when events happen and when they are added to the system, this may not result in a correct value at any given point in time.

Being able to compute values that are correct at historic points in time, as the system 802 is able to do, is critical to creating features that may be used to train predictive models without leakage. Rather than representing the value at every point in time, the system 802 may represent only those values that are observed, such as those values that are returned as part of the results, used in additional computations, etc. The system 802 may represent the value only at the points in time when it changes. For example, the computation "sum(Event.amount)" may only change when an event occurs.

A "temporally correct join" is a join that produces the correct value at every point in time. A lookup is one mechanism for performing a join. To be temporally correct, a lookup must use the temporally correct key to determine the foreign entity to lookup from and it must use the temporally correct value for the foreign entity. Performing a temporally correct join may require a temporal processing engine which can compute the correct values at specific points in time.

In embodiments, to be a temporally correct join, all values used in the join must be temporally correct. This may require a notion of continuity for handling aggregations. If the expression "sum(event.x)" corresponds to the "sum of event.x for all events occurring prior to this time," then there is a corresponding value at every point in time even if no event occurred at that point. Such aggregations may produce continuous values. Joins in a typical system may deal only with values present in the dataset. However, due to continuity, a temporally correct join needs to produce values at points in time when no events occur. Doing so requires reasoning about the continuity of expressions and inferring implicit values at points in time when the expression is not changing.

Performing a temporally correct join in a way that is efficient and distributable requires additional work, as described above and with respect to the drawings, e.g., FIGS. 1, 5A and 5B. As further described herein, lookup also has implications when sampling entities.

In embodiments, the system 802 may allow users to define fine-grained permissions on the data within the system. This may include, for example, limiting access to specified fields to certain users and/or requiring specific operations, such as hashing or aggregation, to be applied before the data is sent to a device or used in specific ways. These ACLs may additionally, or alternatively, indicate that certain features may be used or operated on in certain ways (transferred between compute units, aggregated, etc.) only if other privacy or anonymization techniques are employed. For example, reporting feature vectors from a device may be allowed only if the user ID and other user identifying features are removed and/or anonymized. The specific techniques may be provided by the user of the system.

In embodiments, the system 802 may keep an audit log of actions taken by users in the system. The audit log may include information such as the time the action took place, who took the action, and details of the action taken. The audit log may include information about which data columns were returned from a query, or which entities were shown in results. The audit log may contain authentication & authorization information. The audit log may contain information related to the ACLs discussed above. The audit log may be available to users of the system 802 to investigate previous access or usage history. The audit log may be available to only certain types of users in the system, such as administrators.

In embodiments, the system 802 may attempt to report errors in a way that clearly identifies what the user did wrong. Such efforts may include techniques based on simple static information typically handled by compilers, such as referencing an undefined field. Such efforts may extend to data-centric techniques used at runtime, such as the intersection of key sets used in a join.

Figure 13:
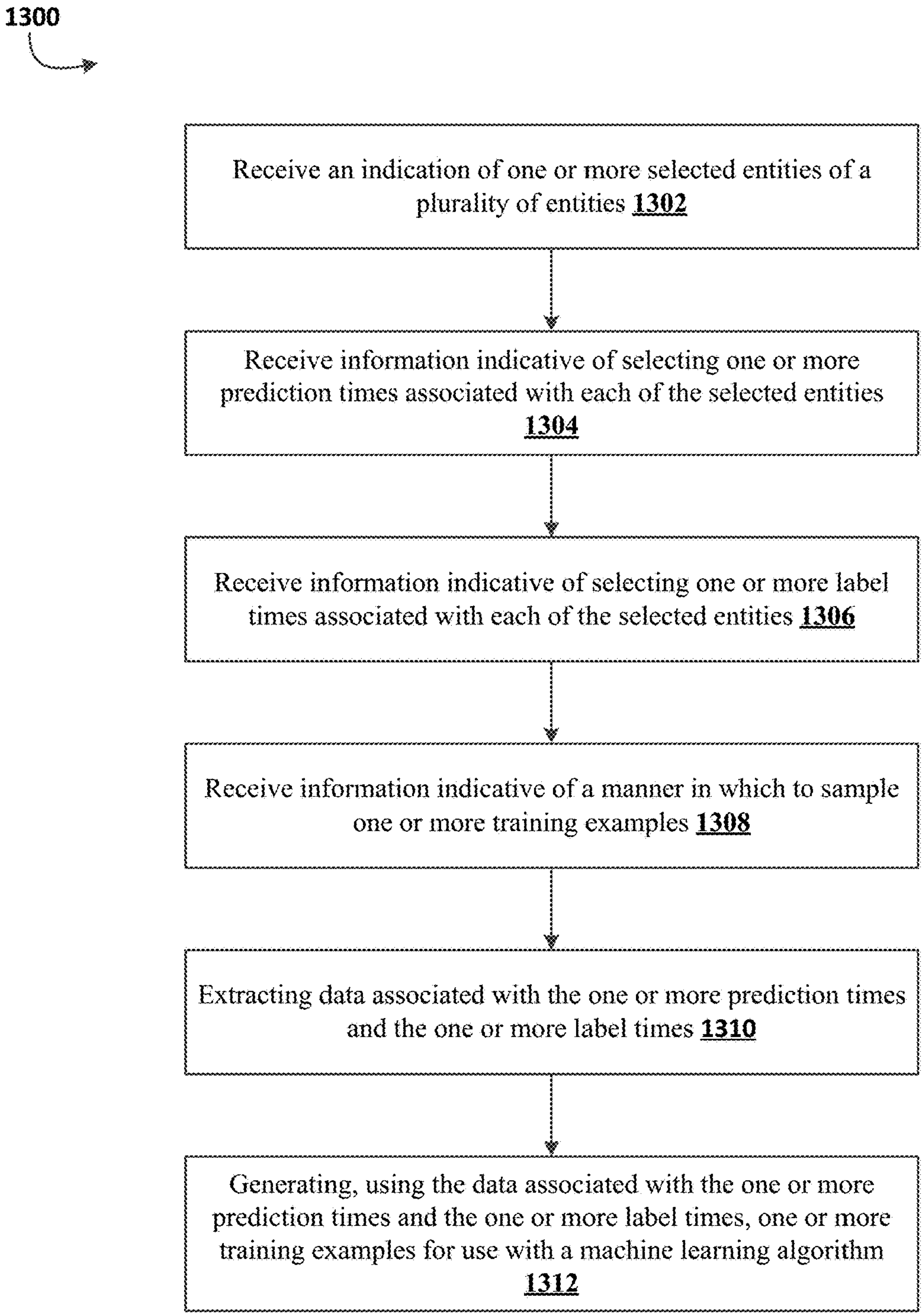
FIG. 13 shows an example feature engineering method.

FIG. 13 shows an example feature engineering method 1300. Method 1300 may be performed, for example, by feature engineering system 100 in FIG. 1, feature engineering system 200 in FIG. 2, and/or feature engineering system 802 in FIG. 8. Method 1300 may be performed to efficiently create event-based feature vectors and/or examples, such as training or validation examples, for a user. The feature vectors and/or examples may be created by combining feature values at multiple points-in time, such as at one or more prediction times and one or more label times. The user may define how the feature engineering system is to choose these multiple points-in-time. The feature engineering system is configured to ingest event data from one or more sources of data, such as sources of data 101, 102. In some configurations, a data source includes historical data, e.g., from historical data sources. In that case, the data includes data that was received and/or stored within a historic time period, i.e. not real-time. The historical data is typically indicative of events that occurred within a previous time period. For example, the historic time period may be a prior year or a prior two years, e.g., relative to a current time, etc. Historical data sources may be stored in and/or retrieved from one or more files, one or more databases, an offline source, and the like or may be streamed from an external source. The historical data ingested by the feature engineering system may be associated with a user of the feature engineering system, such as a data scientist, that wants to train and implement a model using features generated from the data.

In other configurations, the data source includes a stream of data, e.g., indicative of events that occur in real-time. For example, a stream of data may be sent and/or received contemporaneous with and/or in response to events occurring. In an embodiment, the data stream includes an online source, for example, an event stream that is transmitted over a network such as the Internet. The data stream may come from a server and/or another computing device that collects, processes, and transmits the data and which may be external to the feature engineering system. The real-time event-based data ingested by the feature engineering system may also be associated with a user of the feature engineering system, such as a data scientist, that wants to train and implement a model using features generated from the data. The feature engineering system may ingest one or more of the historical data and/or the real-time event-based data from one or more sources and use it to compute features.

The ingested data is indicative of one or more entities associated with one or more of the events. For example, if an event is a scheduled flight, an entity associated with that event may include the airport that the flight is scheduled to depart from, the airport that the flight is scheduled to arrive at, and/or the airline. In an embodiment, the feature engineering system is configured to determine an entity associated with an event in the ingested data. For example, a feature engine of the feature engineering system may determine the entity associated with the event using the schema, the fields, and/or the labels of the data. As another example, the ingested data may indicate the entity, such as by a name, number, or other identifier. Because the ingested data is event-based data, the ingested data may inherently be partitioned by entity.

In an embodiment, the data source includes a plurality of data streams. If the data source includes a plurality of data streams, the feature engineering system may merge two or more of the plurality of data streams into a single stream. If the feature engineering system merges two or more of the plurality of data streams into a single stream, the feature engineering system tracks which of the plurality of data streams the data was originally associated with. This allows the feature engineering system to process the single merged stream while producing results identical to if it had had to separately process each of the input streams. Performing a single merge operation may be more efficient than merging multiple separate subsets of the input.

As discussed above, a user of the feature engineering system may want to generate feature vectors and/or examples for a machine learning model. The user may configure the example selection, such as via a feature studio of the feature engineering system, based on the model that the user is trying to train, or the problem that the user is trying to solve. As described above with respect to FIG. 1, the user may configure the example selection by instructing the feature engineering system to how to select one or more entities that should be included in the samples, how to select prediction and label times, and how the examples should be sampled. Accordingly, the user is able to configure the example selection by providing a series of simple instructions to the feature engineering system.

At 1302, an indication of one or more selected entities of a plurality of entities may be received. The one or more selected entities include the entities that the user wants to be included in the feature vectors and/or examples. The indication may instruct the feature engineering system to include the selected entities in the feature vectors and/or examples.

In addition to instructing the feature engineering system to select one or more entities that should be included in the feature vectors and/or examples, the user also instructs the feature engineering system how to select one or more prediction times that should be used in the feature vectors and/or example generation. The user may instruct the feature engineering system to select the prediction time(s) at a time at which the user wants to make a prediction about an event. At 1304, information indicative of selecting one or more prediction times associated with each of the selected entities may be received. As is discussed above, the user may instruct the feature engineering system to select the prediction time(s) in a variety of different ways. In an embodiment, the user may instruct the feature engineering system to select the prediction time(s) at fixed times. If the prediction time(s) are selected at fixed times, the prediction time(s) may be selected at a fixed time before the corresponding label times. For example, the prediction time(s) may be selected a month, three weeks, 24-hours, one-hour, or any other fixed time before the label times. In another embodiment, the user may instruct the feature engineering system to select the prediction time(s) to occur when a particular event occurs. If the user instructs the feature engineering system to select the prediction time(s) to occur when a particular event occurs, then the selection of prediction time(s) may not be dependent on the label times. In another embodiment, the user may instruct the feature engineering system to select the prediction time(s) at computed times. For example, if an event-based model is to predict whether a scheduled flight will depart on time, then the prediction time(s) may be selected at points-in-time calculated to be one hour before scheduled flight departure times.

The information indicative of selecting the one or more prediction times may instruct the feature engineering system how to select the one or more prediction times during feature vectors and/or example generation. For example, if the user instructs the feature engineering system to select the prediction time(s) at fixed times, then the information indicative of selecting the one or more prediction times may instruct the feature engineering system to select the one or more prediction times at the fixed times specified by the user.

In addition to instructing the feature engineering system how to select one or more prediction times, the user also instructs the feature engineering system how to select one or more label times that should be used in the feature vectors and/or example generation. Each of the one or more label times selected by the feature engineering system corresponds to at least one of the one or more prediction times selected by the feature engineering system, and each label time occurs after the one or more prediction times corresponding to that label time. The label time corresponding to one or more prediction time(s) may be a time at which an outcome of the event is known. At 1306, information indicative of selecting one or more label times associated with each of the selected entities may be received. As is also discussed above, the user may instruct the feature engineering system to select the corresponding label times used to generate the feature vectors and/or examples for the event-based model in a variety of different ways. In an embodiment, the user may instruct the feature engineering system to select the label times at fixed times. The fixed time may be, for example, today, or on the 1st of a month, or any other fixed time. In another embodiment, the user may instruct the feature engineering system to select the label times to occur at fixed offset times after the corresponding prediction time(s)s. In another embodiment, the user may instruct the feature engineering system to select the label times when a particular event occurs. In yet another embodiment, the user may instruct the feature engineering system to select the label times at computed times.

The user may also specify how the feature engineering system should sample the feature vectors and/or examples. At 1308, information indicative of a manner in which to sample feature vectors and/or examples may be received. As an illustrative example, if the user wants feature vectors and/or examples for a model that is supposed to predict if an individual will quit their job, the user may want the sample to include examples of both individuals that quit and individuals that did not quit. As another illustrative example, if the user wants feature vectors and/or examples for a model that is supposed to predict if a house will sell, the user may want the sample to include only examples of houses that did sell. As another illustrative example, if the user wants feature vectors and/or examples for a model that is supposed to predict how many months it will take for a house to sell, the user may want the sample to include examples of both houses that sold and houses that have not sold. The information indicative of the manner in which to sample feature vectors and/or examples may instruct the feature engineering system on how to sample to feature vectors and/or examples.

To generate the feature vectors and/or examples, the feature engineering system selects the prediction time(s) and corresponding label time(s) based on the instructions received from the user. The feature engineering system then computes feature values for the one or more selected entity at the selected prediction time(s) and corresponding label time(s). At 1310, data associated with the one or more prediction times and the one or more label times may be extracted. The extracted data may indicate feature values for the one or more selected entity at the one or more selected prediction time(s) and corresponding label time(s). If a manner for sampling the feature vectors and/or examples was provided by the user, the feature engineering system may sample the feature vectors and/or examples according to the manner specified by the user. If the feature engineering system merged two or more of the plurality of data streams into a single stream, then extracting the data associated with the one or more prediction times and the one or more label times may include tracking which of the plurality of data streams the data associated with the one or more prediction times and the one or more label times is associated with.

In an embodiment, the feature engineering system may need to lookup feature values from more than one entity in order to extract the data associated with the one or more prediction times and the one or more label times. If, based on events associated with the one or more selected entities, the feature engineering system determines that a lookup from another entity (i.e. a calculated entity) is needed, the feature engineering system may retrieve, from at least calculated entity, information associated with the at least one of the one or more prediction times or the one or more label times. The calculated entity may include a selected entity or may be different than the one or more selected entities. The lookup may be performed in the manner described above.

The extracted data is then used by the feature engineering system to generate feature vectors and/or examples. As described above, feature vectors and/or examples generated by combining feature values at more than one point-in-time are useful for training an event-based model so that it is able to make accurate event-based predictions at a point-in-time. At 1312, one or more feature vectors and/or examples for use with a machine learning algorithm may be generated. The one or more feature vectors and/or examples may be generated using the data associated with the one or more prediction times and/or the data associated with the one or more label times. The one or more feature vectors and/or examples may be generated, at least in part, by combining the features values from all events up to and including the prediction time(s) and the feature values at the corresponding label times. For example, the one or more feature vectors and/or examples may be generated by combining values of one or more predictor features associated with the one or more selected entities at the one or more label prediction times with the values of one or more label features associated with the one or more selected entities at the one or more label times. If the feature engineering system performed a lookup when extracting the data associated with the one or more prediction times and the one or more label times, the one or more examples may be generated, at least in part, on the information retrieved from the at least calculated entity.

In an embodiment, generating the one or more feature vectors and/or examples is accomplished, at least in part, on aggregating the extracted data associated with at least one of the one or more prediction times or the one or more label times. Aggregating the extracted data associated with at least one of the one or more prediction times may be accomplished by aggregating data associated with times prior to the prediction time(s). Aggregating the extracted data may involve temporally aggregating the extracted data in a manner described above.

In an embodiment, one or more of the feature vectors and/or examples generated is a negative training example. As discussed above, if a model is trained using only positive training examples, the model will not be able to make accurate predictions. For example, if an event-based model is supposed to predict whether an individual will quit a subscription service within the next month, but the model is only trained with examples of individuals quitting the subscription service, then the model will always predict that individuals will quit the subscription service within the next month. To prevent this, the model may be trained using negative training examples in addition to positive training examples. For example, the model may be trained using examples of individuals that did not quit the subscription service. These negative training examples may be generated by a feature engineering system in the same manner as positive training examples.

Figure 14:
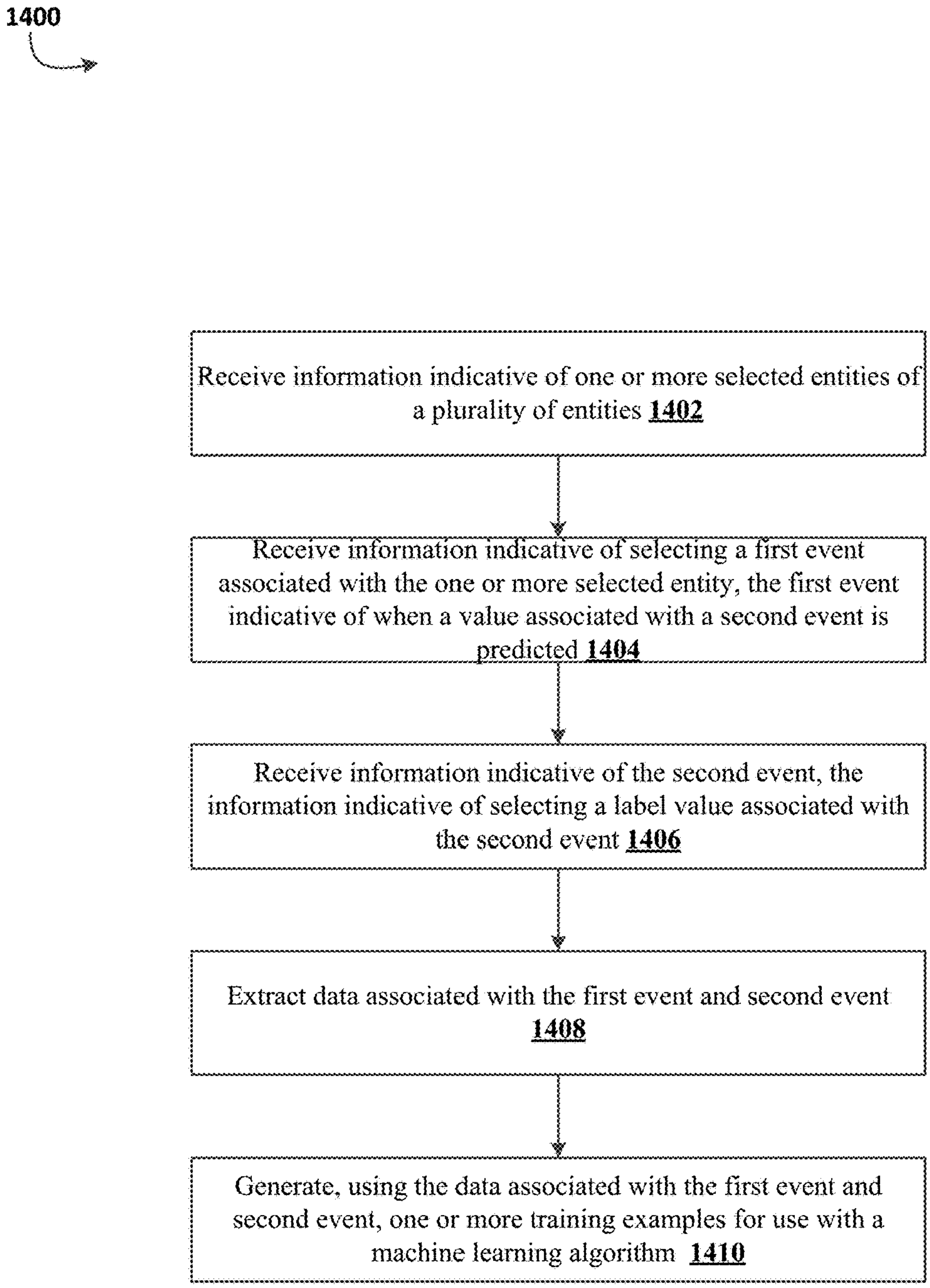
FIG. 14 shows an example feature engineering method.

As described above, a user of a feature engineering system, such as feature engineering system 100 in FIG. 1, feature engineering system 200 in FIG. 2., and/or feature engineering system 802 in FIG. 8, is able to define features and configure example selection using a user-friendly interface. The feature engineering system can use this information to efficiently create the desired features and/or feature vectors and/or examples for the user—without the user ever having to write complex code. FIG. 14 shows an example feature engineering method 1400. Method 1400 may be performed, for example, by feature engineering system 100 in FIG. 1, feature engineering system 200 in FIG. 2, and/or feature engineering system 802 in FIG. 8. Method 1400 may be performed to efficiently create event-based feature vectors and/or examples for a user. The feature vectors and/or examples may be created by combining feature values associated with multiple point(s)-in-time. The user may define how the feature engineering system is to identify multiple events, and based on this user input, the feature engineering system can determine the correct time(s) at which to evaluate feature values. The feature vectors and/or examples created by the feature engineering system may be used by the user in order to train an event-based model to make predictions about a large number of future events.

The feature engineering system is configured to ingest event data from one or more sources of data, such as sources of data 101, 102. In some configurations, a data source includes historical data, e.g., from historical data sources. In that case, the data includes data that was received and/or stored within a historic time period, i.e. not real-time. The historical data is typically indicative of events that occurred within a previous time period. For example, the historic time period may be a prior year or a prior two years, e.g., relative to a current time, etc. Historical data sources may be stored in and/or retrieved from one or more files, one or more databases, an offline source, and the like or may be streamed from an external source. The historical data ingested by the feature engineering system may be associated with a user of the feature engineering system, such as a data scientist, that wants to train and implement a model using features generated from the data.

In other configurations, the data source includes a stream of data, e.g., indicative of events that occur in real-time. For example, a stream of data may be sent and/or received contemporaneous with and/or in response to events occurring. In an embodiment, the data stream includes an online source, for example, an event stream that is transmitted over a network such as the Internet. The data stream may come from a server and/or another computing device that collects, processes, and transmits the data and which may be external to the feature engineering system. The real-time event-based data ingested by the feature engineering system may also be associated with a user of the feature engineering system, such as a data scientist, that wants to train and implement a model using features generated from the data. The feature engineering system may ingest one or more of the historical data and/or the real-time event-based data from one or more sources and use it to compute features.

The ingested data is indicative of one or more entities associated with one or more of the events. For example, if an event is a scheduled flight, an entity associated with that event may include the airport that the flight is scheduled to depart from, the airport that the flight is scheduled to arrive at, and/or the airline. In an embodiment, the feature engineering system is configured to determine an entity associated with an event in the ingested data. For example, a feature engine of the feature engineering system may determine the entity associated with the event using the schema, the fields, and/or the labels of the data. As another example, the ingested data may indicate the entity, such as by a name, number, or other identifier. Because the ingested data is event-based data, the ingested data may inherently be partitioned by entity.

At 1402, an indication of one or more selected entities of a plurality of entities may be received. The one or more selected entities include the entities that the user wants to be included in the feature vectors and/or examples. The indication may instruct the feature engineering system to include the selected entities in the feature vectors and/or examples. In addition to instructing the feature engineering system how to select one or more entities that should be included in the examples, the user also instructs the feature engineering system how to select one or more first times that should be used in the feature vectors and/or example generation. The one or more first times occur when the user wants to make a prediction about an event. At 1404, information indicative of selecting a first time associated with the one or more selected entities is received. The first event is indicative of when a value associated with a second event is predicted. The feature engineering system can determine a correct time at which evaluate a feature value based on identifying the first time(s) based on the instructions provided by the user. The user also instructs the feature engineering system how to select one or more second times that should be used in the feature vectors and/or example generation. The one or more second times occur when the user knows the outcome they wish to predict.

The user also instructs the feature engineering system how to select one or more second times that should be used in the feature vectors and/or example generation. At 1406, information indicative of the second time is received. The received information is indicative of how to select a label value associated with the second time. The feature engineering system can determine a correct time at which evaluate a feature value based on identifying the second time(s).

To generate the feature vectors and/or examples, the feature engineering system identifies the prediction time(s) based on the first time and identifies the corresponding label time(s) based on the second time. At 1408, data associated with the first time and the second time is extracted. The extracted data may include feature values for the one or more selected entities at the identified prediction time(s) and corresponding label time(s).

In an embodiment, the feature engineering system may need to look up feature values from more than one entity in order to extract the data associated with the first time and/or second time. If, based on events associated with the one or more selected entities, the feature engineering system determines that a lookup from another entity (i.e. a calculated entity) is needed, the feature engineering system may retrieve, from at least calculated entity, information associated with the at least one of the first or second times. The calculated entity may include a selected entity or may be different than the one or more selected entities. The lookup may be performed in the manner described above.

The extracted data is then used by the feature engineering system to generate feature vectors and/or examples. As described above, feature vectors and/or examples generated by combining feature values at more than one point-in-time are useful for training an event-based model so that it is able to make a large number of accurate event-based predictions at a point-in-time. At 1410, one or more feature vectors and/or examples for use with a machine learning algorithm may be generated. The one or more feature vectors and/or examples may be generated using the extracted data associated with the first time and second time. For example, the one or more feature vectors and/or examples may be generated, at least in part, by combining the features values from all events up to and including the identified prediction time(s) and the feature values at the identified label times. For example, the one or more feature vectors and/or examples may be generated by combining values of one or more predictor features associated with the one or more selected entities at the one or more label prediction times with the values of one or more label features associated with the one or more selected entities at the one or more label times. If the feature engineering system performed a lookup when extracting the data associated with the one or more prediction times and the one or more label times, the one or more examples may be generated, at least in part, on the information retrieved from the at least calculated entity.

In an embodiment, generating the one or more feature vectors and/or examples is accomplished, at least in part, on aggregating the extracted data associated with at least one of the first or second times. Aggregating the extracted data associated with the first time may be accomplished by aggregating data associated with times prior to the identified prediction time(s). Aggregating the extracted data may involve temporally aggregating the extracted data in a manner described above.

In an embodiment, one or more of the feature vectors and/or examples generated is a negative training example. As discussed above, if a model is trained using only positive training examples, the model will not be able to make accurate predictions. For example, if an event-based model is supposed to predict whether an individual will quit a subscription service within the next month, but the model is only trained with examples of individuals quitting the subscription service, then the model will always predict that individuals will quit the subscription service within the next month. To prevent this, the model may be trained using negative training examples in additional to positive training examples. For example, the model may be trained using examples of individuals that did not quit the subscription service. These negative training examples may be generated by feature engineering system in the same manner as positive training examples.

Figure 15:
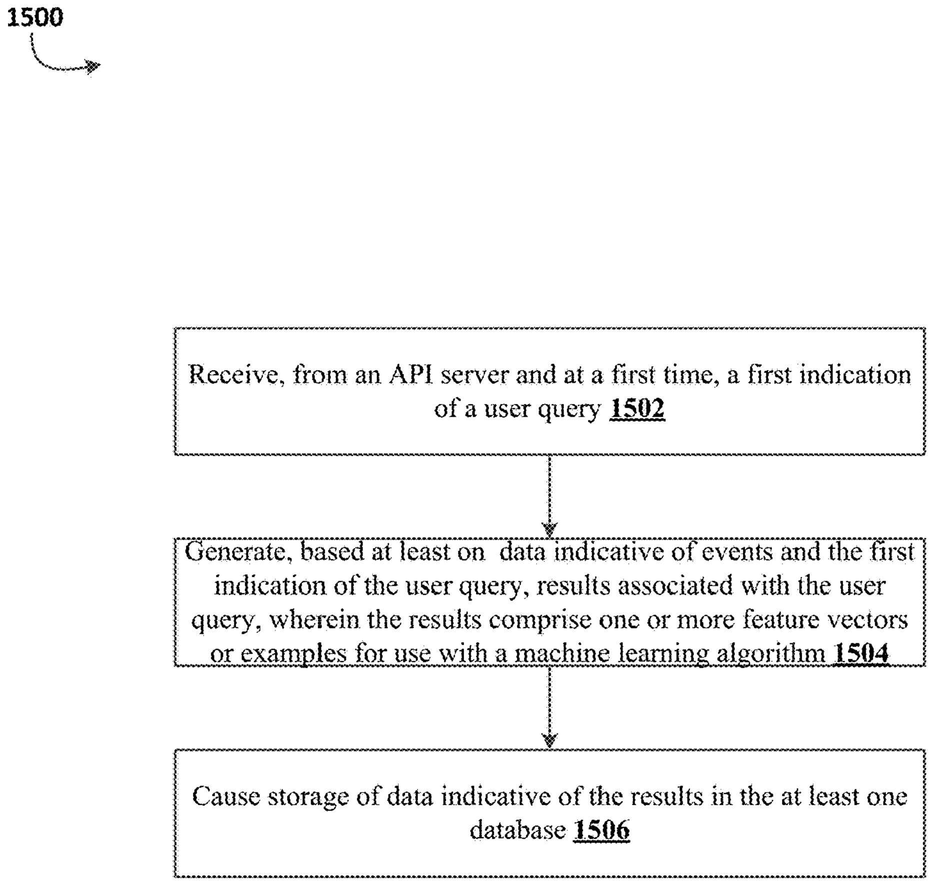
FIG. 15 shows an example feature engineering method.

FIG. 15 shows an example feature engineering method 1500. Method 1500 may be performed, for example, by feature engineering system 100 in FIG. 1, feature engineering system 200 in FIG. 2, and/or feature engineering system 802 in FIG. 8. Method 1500 may be performed to efficiently create event-based feature vectors and/or examples for a user.

A network for feature engineering may include a feature engineering system and one or more clients. The feature engineering system may include an API Server, one or more compute nodes, metadata storage, event data storage, staged data storage, prepared data storage, and result data storage. The event data storage, the staged data storage, and/or the prepared data storage may utilize an external storage system, such as Amazon S3 or any other external storage system. The compute nodes may be, for example, a feature engine, such as one of the feature engines described above.

The API server exposes the capabilities of the feature engineering system to the clients via a variety of API methods. In embodiments, some of the API methods facilitate user issuance of a query over one or more data tables. The API server may receive the query sends an indication of the query and any necessary metadata associated with the tables (e.g., metadata) being queried to compute nodes for processing. At 1502, a first indication of a user query may be received from an API server.

Receiving the first indication of the user query may prompt the retrieval of the necessary event data, such as from event data storage, to produce the results for the query. At 1504, results associated with the user query may be generated, based at least on the retrieved event data and the first indication of the user query. The results may comprise one or more feature vectors or examples for use with a machine learning algorithm. At 1506, storage of data indicative of the results in at least one database may be caused. For example, storage of data indicative of the results in the result data storage may be caused. Depending on the configuration of the query, the results may be written to an external file store and/or returned as part of the query. Query results may also be written to a variety of existing feature stores (e.g., feature stores provided by Redis or Tecton).

In embodiments, the method 1500 may further comprise determining, based on runtime information and during the generation of the results, an error associated with the user query. Sending of an indication of the error to the at least one user device may be caused.

Figure 16:
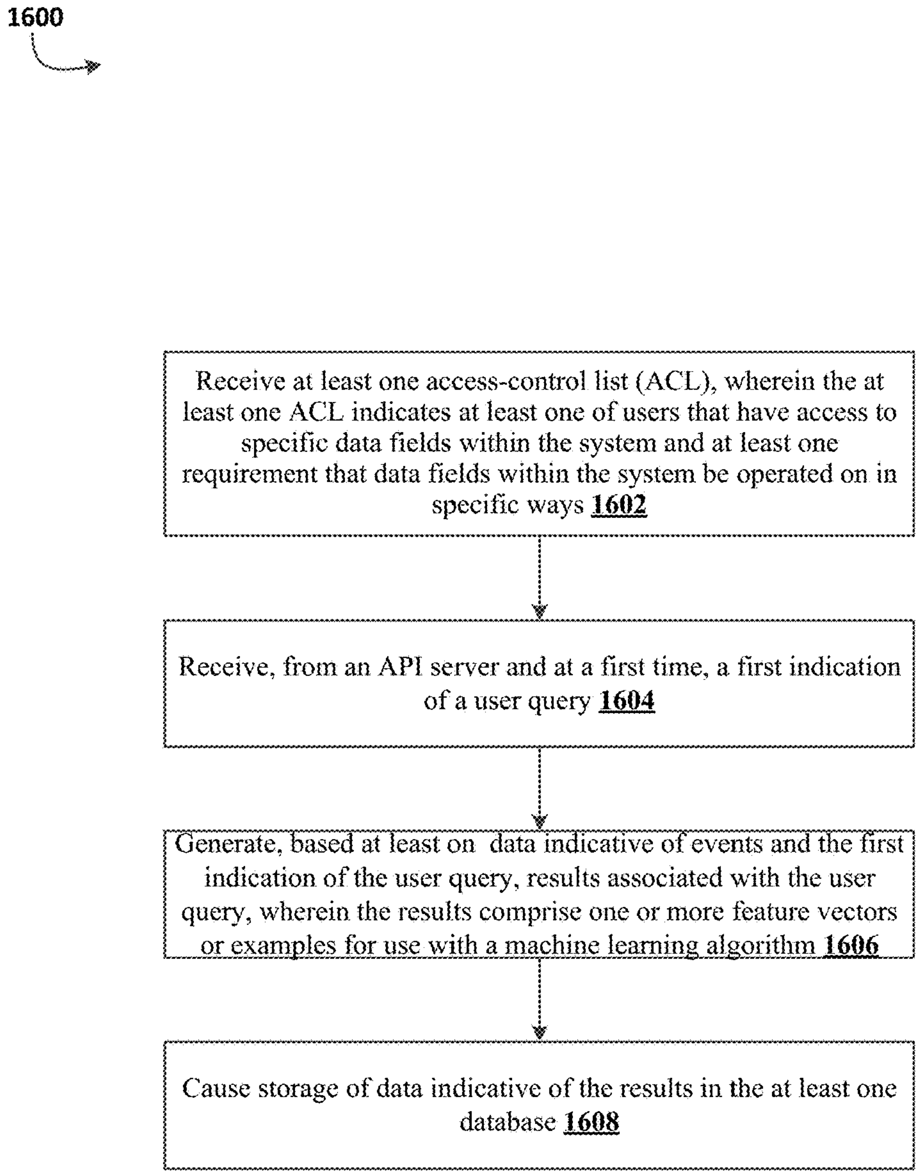
FIG. 16 shows an example feature engineering method.

FIG. 16 shows an example feature engineering method 1600. Method 1600 may be performed, for example, by feature engineering system 100 in FIG. 1, feature engineering system 200 in FIG. 2, and/or feature engineering system 802 in FIG. 8. Method 1600 may be performed to efficiently create event-based feature vectors and/or examples for a user.

A network for feature engineering may include a feature engineering system and one or more clients. The feature engineering system may include an API Server, one or more compute nodes, metadata storage, event data storage, staged data storage, prepared data storage, and result data storage. The event data storage, the staged data storage, and/or the prepared data storage may utilize an external storage system, such as Amazon S3 or any other external storage system. The compute nodes may be, for example, a feature engine, such as one of the feature engines described above.

The feature engineering system may allow users to define fine-grained permissions on the data within the system. At 1602, at least one access-control list (ACL), may be received. The ACL(s) may indicate users that have access to specific data fields within the system. Additionally, or alternatively, the ACL(s) may indicate at least one requirement that data fields within the system be operated on in specific ways. For example, this may include requiring specific operations, such as hashing or aggregation, to be applied before the data is sent to a device or used in specific ways. These ACLs may additionally, or alternatively, indicate that certain features may be used or operated on in certain ways (transferred between compute units, aggregated, etc.) only if other privacy or anonymization techniques are employed. For example, reporting feature vectors from a device may be allowed only if the user ID and other user identifying features are removed and/or anonymized. The specific techniques may be provided by the user of the system.

The API server exposes the capabilities of the feature engineering system to the clients via a variety of API methods. In embodiments, some of the API methods facilitate user issuance of a query over one or more data tables. The API server may receive the query sends an indication of the query and any necessary metadata associated with the tables (e.g., metadata) being queried to compute nodes for processing. At 1604, a first indication of a user query may be received from an API server.

Receiving the first indication of the user query may prompt the retrieval of the necessary event data, such as from event data storage, to produce the results for the query.

At 1606, results associated with the user query may be generated, based at least on the retrieved event data and the first indication of the user query. The results may comprise one or more feature vectors or examples for use with a machine learning algorithm. At 1608, storage of data indicative of the results in at least one database may be caused. For example, storage of data indicative of the results in the result data storage may be caused. Depending on the configuration of the query, the results may be written to an external file store and/or returned as part of the query. Query results may also be written to a variety of existing feature stores (e.g., feature stores provided by Redis or Tecton).

Figure 17:
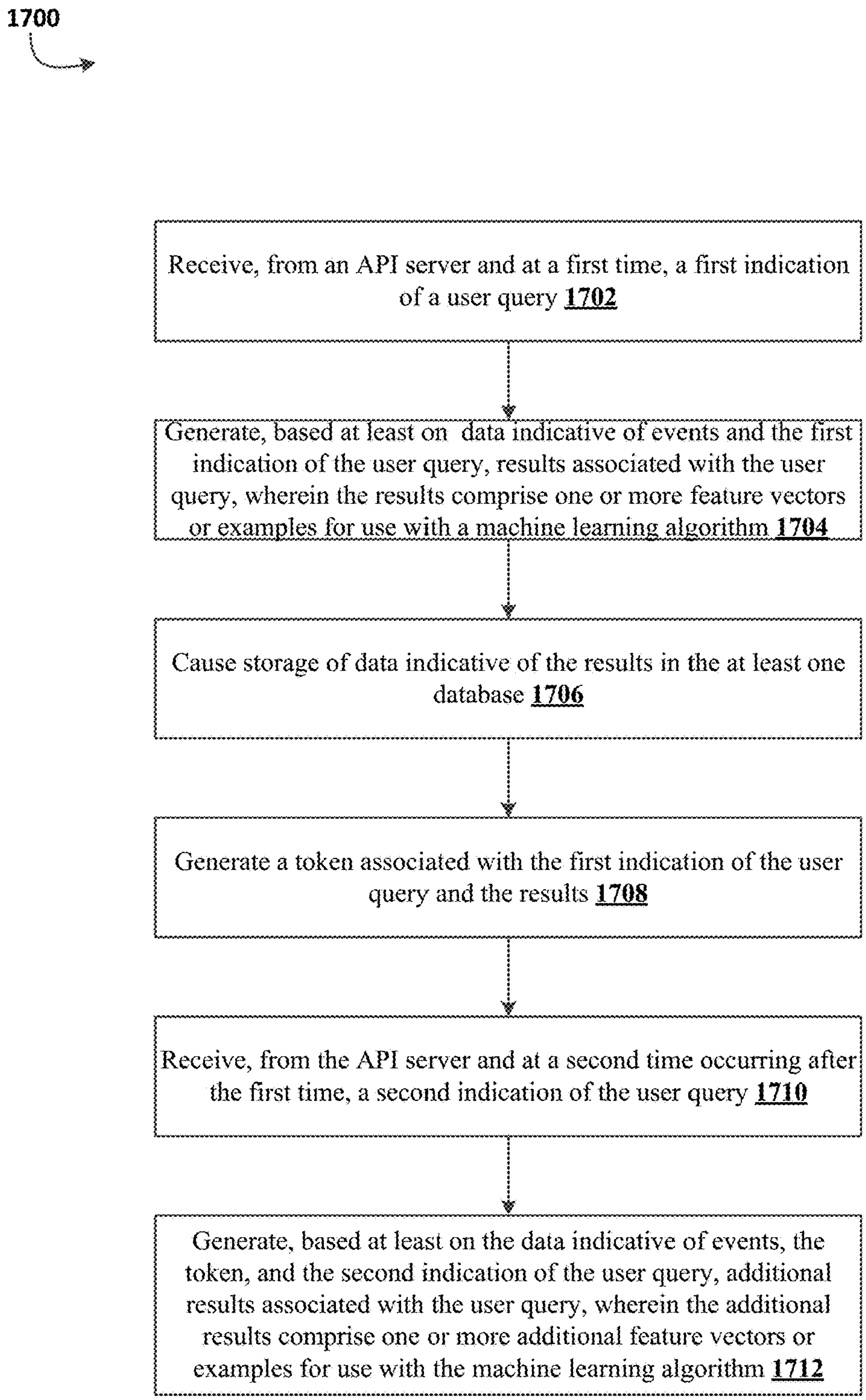
FIG. 17 shows an example feature engineering method.

FIG. 17 shows an example feature engineering method 1700. Method 1700 may be performed, for example, by feature engineering system 100 in FIG. 1, feature engineering system 200 in FIG. 2, and/or feature engineering system 802 in FIG. 8. Method 1700 may be performed to efficiently create event-based feature vectors and/or examples for a user.

A network for feature engineering may include a feature engineering system and one or more clients. The feature engineering system may include an API Server, one or more compute nodes, metadata storage, event data storage, staged data storage, prepared data storage, and result data storage. The event data storage, the staged data storage, and/or the prepared data storage may utilize an external storage system, such as Amazon S3 or any other external storage system. The compute nodes may be, for example, a feature engine, such as one of the feature engines described above.

The API server exposes the capabilities of the feature engineering system to the clients via a variety of API methods. In embodiments, some of the API methods facilitate user issuance of a query over one or more data tables. The API server may receive the query sends an indication of the query and any necessary metadata associated with the tables (e.g., metadata) being queried to compute nodes for processing. At 1702, first information indicative of a first user query may be received from an API server.

Receiving the first indication of the user query may prompt the retrieval of the necessary event data, such as from event data storage, to produce the results for the query. At 1704, results associated with the first user query may be generated, based at least on the retrieved event data and the first information. The results may comprise one or more feature vectors or examples for use with a machine learning algorithm. At 1706, storage of data indicative of the results in at least one database may be caused. For example, storage of data indicative of the results in the result data storage may be caused. Depending on the configuration of the query, the results may be written to an external file store and/or returned as part of the query. Query results may also be written to a variety of existing feature stores (e.g., feature stores provided by Redis or Tecton).

Completed queries provide a resume token indicating the query and results that were returned. At 1708, a token (i.e., a resume token) associated with the first information and the results may be generated. A later query may be performed using the same resume token to get results which have changed since that resume token. At 1710, second information indicative of a second user query may be received from the API server and at a second time occurring after the first time. At 1712, additional results associated with the second user query may be generated based at least on one or more of: the data indicative of events, the resume token, the second indication of the user query, the results, and the first information indicative of the first user query. The additional results comprise one or more additional feature vectors or examples for use with the machine learning algorithm. Each time a new resume token is returned it may be used in a later query to get results since the query which returned that token.

As discussed above, queries for the results since a previous resume token may return significantly smaller sets of results than a complete query. Rows which were previously returned may be omitted. Rows with values that have not changed since they were previously returned may also be omitted. This smaller result size may be faster to load into a storage system for serving feature values. Queries for the results since a previous page token may additionally, or alternatively, require significantly less compute time. This may be accomplished by storing intermediate states from the previous computation reflecting some or all of the events previously processed. When a query with a resume token is received, the intermediate state(s) from an earlier query may be used instead of reprocessing the corresponding events. This may allow the query to process only the new input since the previous query, rather than all of the input. In long running systems, it may quickly be the case that all previously accumulated data is significantly larger than the data arriving in any time interval, so this will often significantly speed up the queries.

Figure 18:
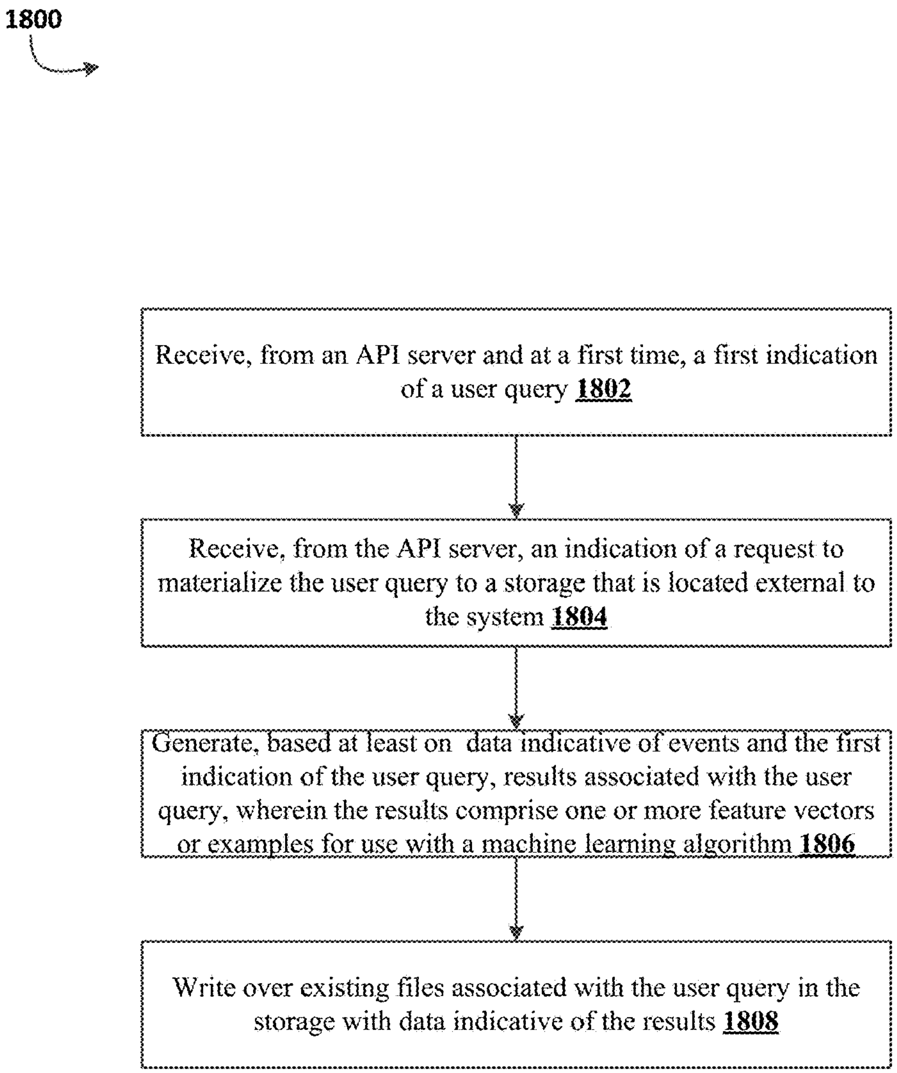
FIG. 18 shows an example feature engineering method.

FIG. 18 shows an example feature engineering method 1800. Method 1800 may be performed, for example, by feature engineering system 100 in FIG. 1, feature engineering system 200 in FIG. 2, and/or feature engineering system 802 in FIG. 8. Method 1800 may be performed to efficiently create event-based feature vectors and/or examples for a user.

A network for feature engineering may include a feature engineering system and one or more clients. The feature engineering system may include an API Server, one or more compute nodes, metadata storage, event data storage, staged data storage, prepared data storage, and result data storage. The event data storage, the staged data storage, and/or the prepared data storage may utilize an external storage system, such as Amazon S3 or any other external storage system. The compute nodes may be, for example, a feature engine, such as one of the feature engines described above.

The API server exposes the capabilities of the feature engineering system to the clients via a variety of API methods. In embodiments, some of the API methods facilitate user issuance of a query over one or more data tables. The API server may receive the query sends an indication of the query and any necessary metadata associated with the tables (e.g., metadata) being queried to compute nodes for processing. At 1802, a first indication of a user query may be received from an API server. At 1804, an indication of a request to materialize the user query to a storage that is located external to the system may be received from the API server. For example, the request may be a request to materialize the user query to an external file store and/or a variety of existing feature stores (e.g., feature stores provided by Redis or Tecton).

Receiving the first indication of the user query may prompt the retrieval of the necessary event data, such as from event data storage, to produce the results for the query. At 1806, results associated with the user query may be generated, based at least on the retrieved event data and the first indication of the user query. The results may comprise one or more feature vectors or examples for use with a machine learning algorithm. At 1808, storage of data indicative of the results in the storage that is located external to the system may be caused. For example, existing files associated with the user query in the storage may be written over with data indicative of the results.

Figure 19:
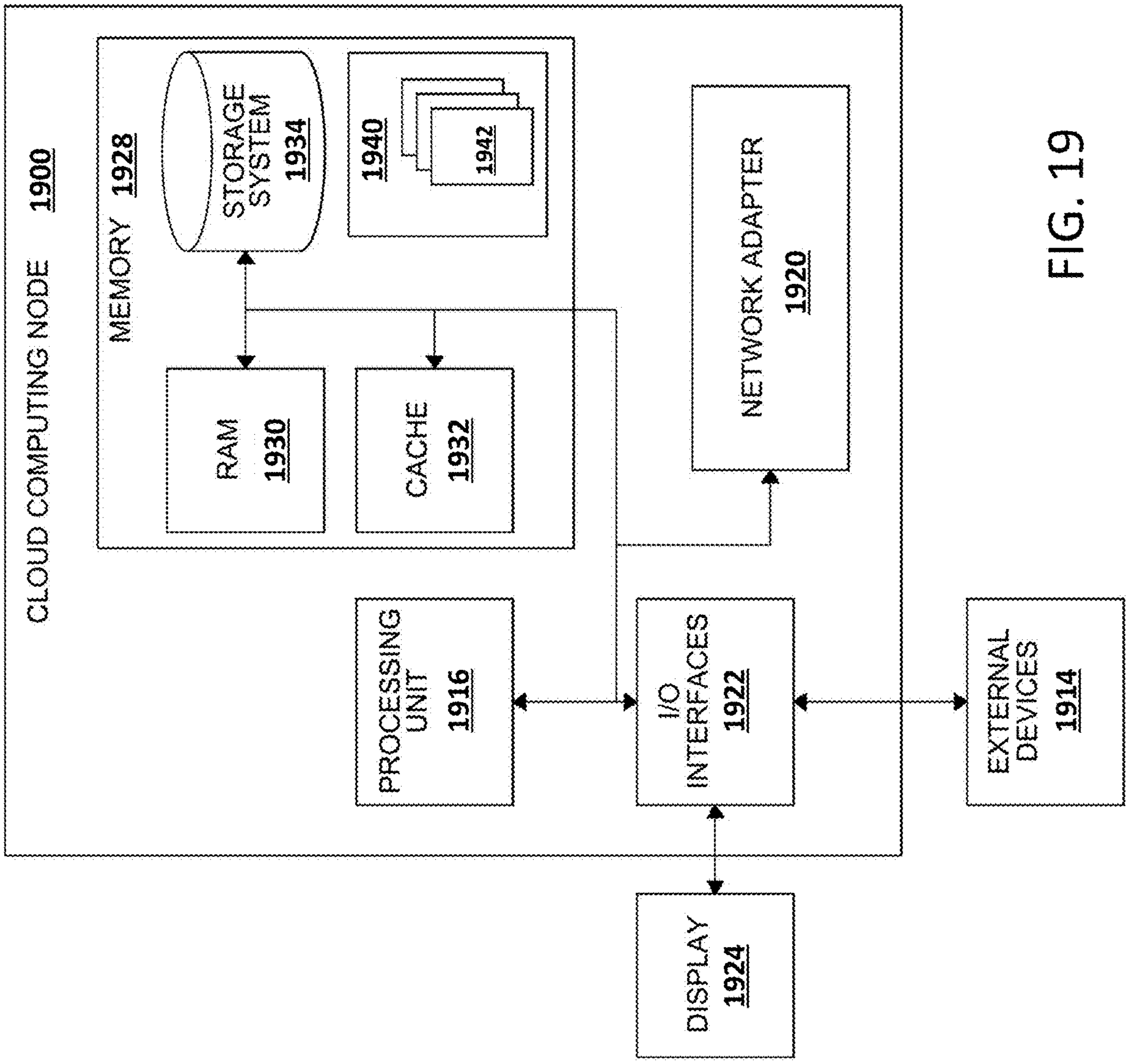
FIG. 19 shows an example computing node.

FIG. 19 shows an example computing node 1900. Computing node 1900 may be a component of feature engineering system 100 in FIG. 1, feature engineering system 200 in FIG. 2, and/or feature engineering system 802 in FIG. 8. Computing node 1900 may include feature engine 103 in FIG. 1 and/or feature engine 203 in FIG. 2 or a component thereof.

Computing node 1900 may be a general-purpose computing device. Computing node 1900 may be a node in a cloud computing environment. Computing node 1900 may be an on-premises device, such as a node of a distributed system running in a user's data center. The components of computing node 1900 may include, but are not limited to, one or more processors or processing units 1916, a system memory 1928, and a bus 1918 that couples various system components including system memory 1928 to processor 1916.

The bus 1918 in the example of FIG. 19 represents one or more of any of several types of bus structures, including a memory bus or memory controller, a peripheral bus, an accelerated graphics port, and a processor or local bus using any of a variety of bus architectures. By way of example, and not limitation, such architectures include industry Standard Architecture ('ISA') bus, Micro Channel Architecture ('MCA') bus, Enhanced ISA ('EISA') bus, Video Electronics Standards Association ('VESA') local bus, and Peripheral Component Interconnects ('PCI') bus.

Computing node 1900 may include a variety of computer system readable media. Such media may be any available media that is accessible by computing node 1900, and it includes both volatile and non-volatile media, removable and non-removable media.

The system memory 1928 in FIG. 19 may include computer system readable media in the form of volatile memory, such as random access memory ('RAM') 1930 and/or cache memory 1932. Computing node 1900 may further include other removable/non-removable, volatile/non-volatile computer system storage media. By way of example only, a storage system 1934 may be provided for reading from and writing to a non-removable, non-volatile magnetic media (not shown and typically called a "hard drive"). Although not shown, a magnetic disk drive for reading from and writing to a removable, non-volatile magnetic disk, e.g., a "floppy disk," and an optical disk drive for reading from or writing to a removable, non-volatile optical disk such as a CD-ROM, DVD-ROM or other optical media may be provided. In such instances, each may be connected to bus 1918 by one or more data media interfaces. As will be further depicted and described below, memory 1928 may include at least one program product having a set, e.g., at least one, of program modules that are configured to carry Gut the functions of embodiments of the invention.

Computing node 1900 may include a program/utility 1940 having a set (at least one) of program modules 1942 that may be stored in memory 1928. Computing node 1900 of FIG. 19 may also include an operating system, one or more application programs, other program modules, and program data. Each of the operating system, one or more application programs, other program modules, and program data or some combination thereof, may include an implementation of a networking environment. Program modules 1942 generally carry out the functions and/or methodologies of embodiments of the invention as described herein.

Computing node 1900 of FIG. 19 may also communicate with one or more external devices 1914 such as a keyboard, a pointing device, a display 1924, and so on that enable a user to interact with computing node 1910. Computing node 1900 may also include any devices, e.g., network card, modem, etc., that enable computing node 1900 to communicate with one or more other computing devices. Such communication may occur, for example, via I/O interfaces 1922. Still yet, computing node 1900 may communicate with one or more networks such as a local area network ('LAN'), a general wide area network ('WAV'), and/or a public network, e.g., the Internet, via network adapter 1920. As depicted, network adapter 1920 communicates with the other components of computing node 1900 via bus 1918. It should be understood that although not shown, other hardware and/or software components could be used in conjunction with computing node 1900. Examples include, but are not limited to, microcode, device drivers, redundant processing units, external disk drive arrays, RAID systems, tape drives, and data archival storage systems and so on.

Figure 20:
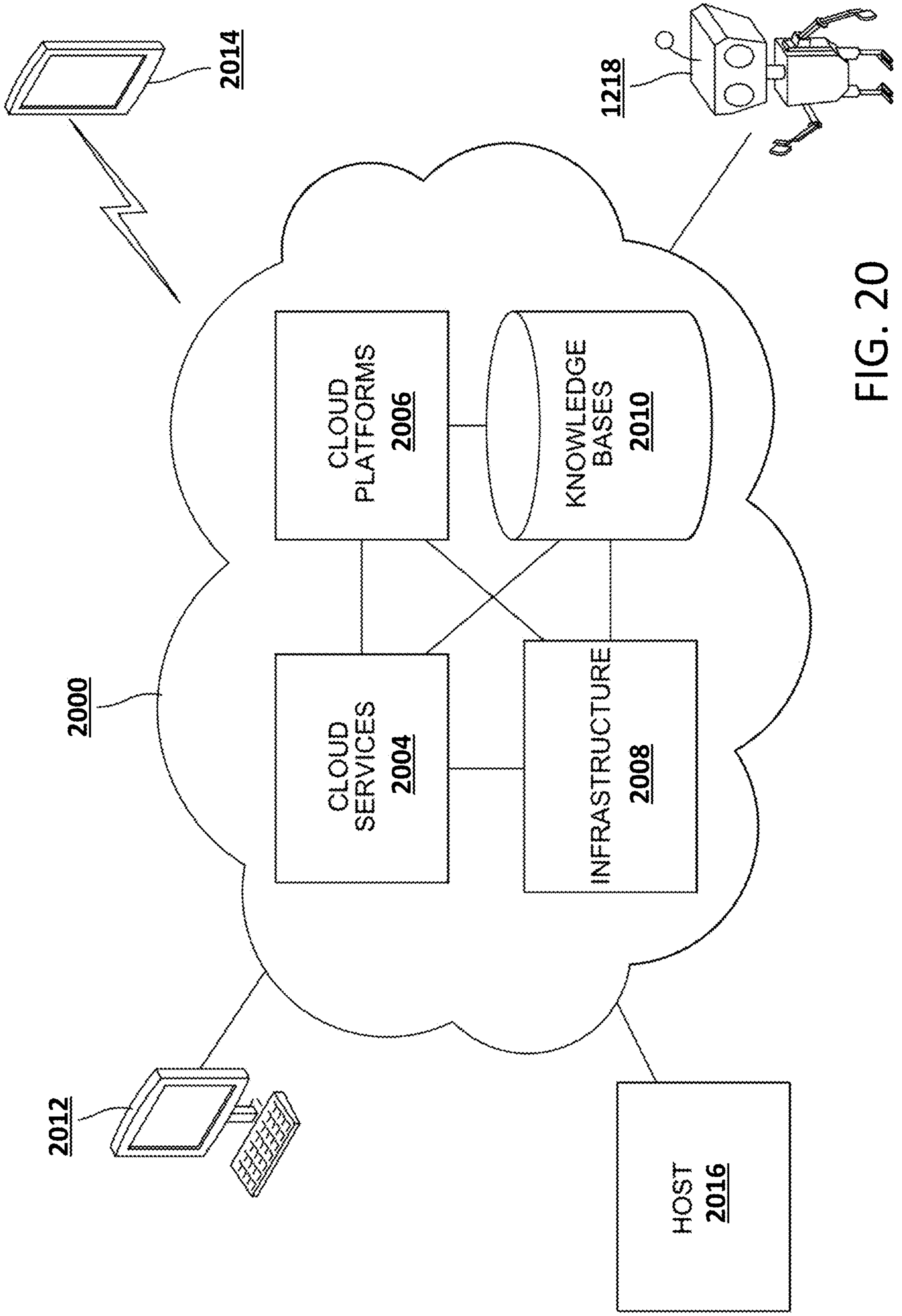
FIG. 20 shows an example cloud computing environment.

FIG. 20 shows example components of a cloud computing system 2000. Cloud computing system 2000 may include feature engineering system 100 in FIG. 1, feature engineering system 200 in FIG. 2, feature engineering system 802 in FIG. 8, feature engine 103 in FIG. 1, and/or feature engine 203 in FIG. 2. Cloud computing system 2000 may be used to perform any of the disclosed methods. Cloud-based computing generally refers to networked computer architectures where application execution, service provision, and data storage may be divided, to some extent, between clients and cloud computing devices. The "cloud" may refer to a service or a group of services accessible over a network, e.g., the Internet, by clients, server devices, and cloud computing systems, for example.

In one example, multiple computing devices connected to the cloud may access and use a common pool of computing power, services, applications, storage, and files. Thus, cloud computing enables a shared pool of configurable computing resources, e.g., networks, servers, storage, applications, and services, that may be provisioned and released with minimal management effort or interaction by the cloud service provider.

As an example, in contrast to a predominately client-based or server-based application, a cloud-based application may store copies of data and/or executable program code in the cloud computing system, while allowing client devices to download at least some of this data and program code as needed for execution at the client devices. In some examples, downloaded data and program code may be tailored to the capabilities of specific client devices, e.g., a personal computer, tablet computer, mobile phone, smartphone, and/or robot, accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to users of client devices. Thus, a PC user or a robot client device accessing a cloud-based application may not be aware that the PC or robot downloads program logic and/or data from the cloud computing system, or that the PC or robot offloads processing or storage functions to the cloud computing system, for example.

In FIG. 20, cloud computing system 2000 includes one or more cloud services 2004, one or more cloud platforms 2006, cloud infrastructure 2008 components, and cloud knowledge bases 2010. Cloud computing system 2000 may include more or fewer components, and each of cloud services 2004, cloud platforms 2006, cloud infrastructure components 2008, and cloud knowledge bases 2010 may include multiple computing and storage elements as well. Thus, one or more of the described functions of cloud computing system 2000 may be divided into additional functional or physical components or combined into fewer functional or physical components. In some further examples, additional functional and/or physical components may be added to the examples shown in FIG. 20. Delivery of cloud computing based services may involve multiple cloud components communicating with each other over application programming interfaces, such as web services and multi-tier architectures, for example.

Example cloud computing system 2000 shown in FIG. 20 is a networked computing architecture. Cloud services 2004 may represent queues for handling requests from client devices. Cloud platforms 2006 may include client-interface frontends for cloud computing system 2000. Cloud platforms 2006 may be coupled to cloud services 2004 to perform functions for interacting with client devices. Cloud platforms 2006 may include applications for accessing cloud computing system 2000 via user interfaces, such as a web browser and/or feature studio 215 in FIG. 2. Cloud platforms 2006 may also include robot interfaces configured to exchange data with robot clients. Cloud infrastructure 2008 may include service, billing, and other operational and infrastructure components of cloud computing system 2000. Cloud knowledge bases 2010 are configured to store data for use by cloud computing system 2000, and thus, cloud knowledge bases 2010 may be accessed by any of cloud services 2004, cloud platforms 2006, and/or cloud infrastructure components 2008.

Many different types of client devices may be configured to communicate with components of cloud computing system 2000 for the purpose of accessing data and executing applications provided by cloud computing system 2000. For example, a computer 2012, a mobile device 2014, a host 2016, and a robot client 2018 are shown as examples of the types of client devices that may be configured to communicate with cloud computing system 2000. Of course, more or fewer client devices may communicate with cloud computing system 2000. In addition, other types of client devices may also be configured to communicate with cloud computing system 2000 as well.

Computer 2012 shown in FIG. 20 may be any type of computing device, e.g., PC, laptop computer, tablet computer, etc., and mobile device 2014 may be any type of mobile computing device, e.g., laptop, smartphone, mobile telephone, cellular telephone, tablet computer, etc., configured to transmit and/or receive data to and/or from cloud computing system 2000. Similarly, host 2016 may be any type of computing device with a transmitter/receiver including a laptop computer, a mobile telephone, a smartphone, a tablet computer etc., which is configured to transmit/receive data to/from cloud computing system 2000.

Any of the client devices used with cloud computing system 2000 may include additional components. For example, the client devices one or more sensors, such as a digital camera or other type of image sensor. Other sensors may further include a gyroscope, accelerometer, Global Positioning System (GPS) receivers, infrared sensors, sonar, optical sensors, biosensors, Radio Frequency identification (RFID) systems, Near Field Communication (NFC) chip sensors, wireless sensors, and/or compasses, among others, for example.

Any of the client devices may also include a user-interface (UI) configured to allow a user to interact with the client device. The UI may be various buttons and/or a touchscreen interface configured to receive commands from a human or provide output information to a human. The UI may be a microphone configured to receive voice commands from a human.

In FIG. 20, communication links between client devices and cloud 2000 may include wired connections, such as a serial or parallel bus, Ethernet, optical connections, or other type of wired connection. Communication links may also be wireless links, such as Bluetooth, IEEE 802.11 (IEEE 802.11 may refer to IEEE 802.11-2007, IEEE 802.11n-2009, or any other IEEE 802.11 revision), CDMA, 3G, GSM, WiMAX, or other wireless based data communication links.

In other examples, the client devices may be configured to communicate with cloud computing system 2000 via wireless access points. Access points may take various forms. For example, an access point may take the form of a wireless access point (WAP) or wireless router. As another example, if a client device connects using a cellular air-interface protocol, such as CDMA, GSM, 3G, or 4G, an access point may be a base station in a cellular network that provides Internet connectivity via the cellular network.

As such, the client devices may include a wired or wireless network interface through which the client devices may connect to cloud computing system 2000 directly or via access points. As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol, e.g., CDMA, GSM, or WiMAX, as well as for "WiFi" connectivity using 802.11. Other types of communications interfaces and protocols could be used as well.

What is claimed is:

1. A system for generating machine learning feature vectors, the system comprising:

an event ingestion module that is configured to:

ingest data indicative of events associated with a plurality of entities from one or more sources, at least a portion of the data indicative of events being inherently partitioned based on the associated plurality of entities; and assign arrival timestamps to the data indicative of events using a distributed timestamp assignment, wherein the arrival timestamps comprise a time component, a unique machine identification (ID), and a sequence number;

at least one database configured to store the data indicative of events; and at least one computing node in communication with the at least one database, wherein the at least one computing node is configured at least to:

receive at a first time and by way of an application programming interface (API), first information indicative of a first user query;

generate, based at least on the data indicative of events and the arrival timestamps assigned to the data indicative of events, retrieved from the at least one database based on the first information indicative of the first user query, results associated with the first user query, wherein the results comprise one or more feature vectors for use with a machine learning algorithm; and cause storage of data indicative of the results in a feature store for use by the machine learning algorithm in training a model;

wherein the API is further configured to receive, from a user including a first user, a specific request to materialize results of the first user query to an external feature store, wherein materializing comprises materializing, for each respective entity represented in the results of the first user query, latest feature values to the external feature store, the latest feature values defining a computed feature vector for the respective entity, and wherein the external feature store is configured to serve the computed feature vector as input to the model, and persisting the results of the first user query as a named dataset in the external feature store, wherein the materializing further comprises an incremental materialization that stores a resume token indicating the first user query and the results returned for the first user query, and wherein, in response to a subsequent explicit materialization request for the first user query received via the API from the user including the first user, the at least one computing node is further configured to:

use, for the subsequent explicit materialization request for the first user query received via the API from the user including the first user, the resume token previously stored by the incremental materialization to issue a query request;

process only events that have arrived since a previous materialization of the results of the first user query to generate updated results;

update, in response to receiving a query response for the query request, the resume token previously stored by the incremental materialization; and overwrite at least one corresponding value in the previously materialized named dataset for the first user query in the external feature store with updated results, wherein the updated results consist of changed values.

2. The system of claim 1, wherein the at least one computing node is further configured to:

determine, based on runtime information and during the generation of the results associated with the first user query, an error associated with the first user query; and cause sending of an indication of the error to at least one user device associated with the first user query.

3. The system of claim 1, wherein the at least one computing node is further configured to:

receive at least one Access-Control List (ACL), wherein the at least one ACL indicates at least one of:

users that have access to specific data fields within the system; and at least one requirement that data fields within the system be operated on in specific ways.

4. The system of claim 1, wherein the at least one computing node is further configured to:

generate a token associated with the first information indicative of the first user query and the results associated with the first user query;

receive, at a second time and by way of the API, a second information indicative of a second user query, wherein the second time occurs after the first time;

generate, based at least on the data indicative of events, the arrival timestamps assigned to the data indicative of events, the token, the second information indicative of the second user query, the results associated with the first user query, and the first information indicative of the first user query, additional results associated with the second user query, wherein the additional results comprise one or more additional feature vectors for use with the machine learning algorithm; and cause storage of data indicative of the additional results in the feature store for use by the machine learning algorithm in training.

5. The system of claim 4, wherein:

the first information indicative of the first user query comprises a first configuration;

the second indication of the second user query comprises a second configuration;

the first configuration comprises a first entity configuration, a first point-in-time configuration, and a first sample configuration;

the second configuration comprises a second entity configuration, a second point-in-time configuration, and a second sample configuration;

the at least one computing node persisting the results of the first user query as the named dataset further comprises assigning a persisted timestamp to the named dataset;

the external feature store comprises a plurality of named datasets; and the at least one computing node is further configured to:

deploy the first configuration and assign a first deployment time to the first configuration in response to deployment of the first configuration;

generate the results associated with the first user query further based on the first configuration;

determine a difference between the first configuration and the second configuration to define the second configuration as a configuration update;

deploy the configuration update and assign a second deployment time to the configuration update in response to deployment of the configuration update;

compare the persisted timestamps of the plurality of named datasets with the second deployment time of the configuration update to identify outdated named datasets and to identify portions of the data indicative of events associated with the outdated named datasets identified;

generate updated results based on the portions of the data indicative of events associated with the outdated named datasets identified and the configuration update; and persist the updated results as updated named datasets to replace the outdated named datasets identified from the plurality of named datasets in the external feature store.

6. The system of claim 1, wherein the first user query is associated with a token, the token indicating a state of the system at which the at least one computing node is to generate the results associated with the first user query.

7. The system of claim 1, wherein the API employs a plurality of client libraries, each of the plurality of client libraries providing interfaces that interact with one or more predefined data science tools using methods associated with the API.

8. A method for generating machine learning feature vectors using data indicative of events associated with a plurality of entities, the method comprising:

ingesting the data indicative of events associated with the plurality of entities from one or more sources, at least a portion of the data indicative of events being inherently partitioned based on the associated plurality of entities;

assigning arrival timestamps to the data indicative of events by using a distributed timestamp assignment, wherein the arrival timestamps comprise a time component, a unique machine identification (ID), and a sequence number;

receiving, at a first time and by way of an application programming interface (API) configured to receive a first user query from at least one user device, a first indication of the first user query;

generating, based at least on the data indicative of events and the arrival timestamps assigned to the data indicative of events, retrieved from at least one database based on the first indication of the first user query, results associated with the first user query, wherein the results comprise one or more feature vectors or examples for use with a machine learning algorithm; and causing storage of data indicative of the results in a feature store for use by the machine learning algorithm in training a model, wherein the API is further configured to receive, from a user including a first user, a specific request to materialize results of the first user query to an external feature store, wherein materializing comprises materializing, for each respective entity represented in the results of the first user query, latest feature values to the external feature store, the latest feature values defining a computed feature vector for the respective entity, and wherein the external feature store is configured to serve the computed feature vector as input to the model, and persisting the results of the first user query as a named dataset in the external feature store, wherein the materializing further comprises an incremental materialization that stores a resume token indicating the first user query and the results returned for the first user query, and wherein, in response to a subsequent explicit materialization request for the first user query received via the API from the user including the first user, the method further comprises:

using, for the subsequent explicit materialization request for the first user query received via the API from the user including the first user, the resume token previously stored by the incremental materialization to issue a query request;

processing only events that have arrived since a previous materialization of the results of the first user query to generate updated results;

updating, in response to receiving a query response for the query request, the resume token previously stored by the incremental materialization; and overwriting at least one corresponding value in the previously materialized named dataset for the first user query in the external feature store with updated results, wherein the updated results consist of changed values.

9. The method of claim 8, further comprising:

determining, based on runtime information and during the generation of the results associated with the first user query, an error associated with the first user query; and causing sending of an indication of the error to the at least one user device.

10. The method of claim 8, further comprising:

receiving at least one Access-Control List (ACL), wherein the at least one ACL indicates at least one of:

users that have access to specific data fields; and at least one requirement that data fields be operated on in specific ways.

11. The method of claim 8, further comprising:

generating a token associated with the first indication of the first user query and the results associated with the first user query;

receiving at a second time and by way of the API a second indication of a second user query, wherein the second time occurs after the first time;

generating, based at least on the data indicative of events, the arrival timestamps assigned to the data indicative of events, the token, the second indication of the second user query, the results associated with the first user query, and the first indication of the first user query, additional results associated with the second user query, wherein the additional results comprise one or more additional feature vectors for use with the machine learning algorithm; and storing data indicative of the additional results in a feature store for use by the machine learning algorithm in training.

12. The method of claim 8, wherein the first user query is associated with a token, the token indicating a state at which at least one computing node is to generate the results associated with the first user query.

13. The method of claim 8, wherein the API employs a plurality of client libraries, each of the plurality of client libraries providing interfaces that interact with one or more predefined data science tools using methods associated with the API.

14. A non-transitory computer-readable medium storing instructions that, when executed, cause operations comprising:

ingesting data indicative of events associated with a plurality of entities from one or more sources, at least a portion of the data indicative of events being inherently partitioned based on the associated plurality of entities;

assigning arrival timestamps to the data indicative of events by using a distributed timestamp assignment, wherein the arrival timestamps comprise a time component, a unique machine identification (ID), and a sequence number;

receiving, at a first time and by way of an application programming interface (API) configured to receive a first user query from at least one user device, a first indication of the first user query;

generating, based at least on the data indicative of events and the arrival timestamps assigned to the data indicative of events, retrieved from at least one database based on the first indication of the first user query, results associated with the first user query, wherein the results comprise one or more feature vectors or examples for use with a machine learning algorithm; and causing storage of data indicative of the results in a feature store for use by the machine learning algorithm in training a model, wherein the API is further configured to receive, from a user including a first user, a specific request to materialize results of the first user query to an external feature store, wherein materializing comprises materializing, for each respective entity represented in the results of the first user query, latest feature values to the external feature store, the latest feature values defining a computed feature vector for the respective entity, and wherein the external feature store is configured to serve the computed feature vector as input to the model, and persisting the results of the first user query as a named dataset in the external feature store, wherein the materializing further comprises an incremental materialization that stores a resume token indicating the first user query and the results returned for the first user query, and wherein, in response to a subsequent explicit materialization request for the first user query received via the API from the user including the first user, the operations further comprises:

using, for the subsequent explicit materialization request for the first user query received via the API from the user including the first user, the resume token previously stored by the incremental materialization to issue a query request;

processing only events that have arrived since a previous materialization of the results of the first user query to generate updated results;

updating, in response to receiving a query response for the query request, the resume token previously stored by the incremental materialization; and overwriting at least one corresponding value in the previously materialized named dataset for the first user query in the external feature store with updated results, wherein the updated results consist of changed values.

15. The non-transitory computer-readable medium of claim 14, the operations further comprising:

determining, based on runtime information and during the generation of the results associated with the first user query, an error associated with the first user query; and causing sending of an indication of the error to the at least one user device.

16. The non-transitory computer-readable medium of claim 14, the operations further comprising:

receiving at least one Access-Control List (ACL), wherein the at least one ACL indicates at least one of:

users that have access to specific data fields; and at least one requirement that data fields be operated on in specific ways.

17. The non-transitory computer-readable medium of claim 14, the operations further comprising:

generating a token associated with the first indication of the first user query and the results associated with the first user query;

receiving at a second time and by way of the API a second indication of a second user query, wherein the second time occurs after the first time;

generating, based at least on the data indicative of events, the arrival timestamps assigned to the data indicative of events, the token, the second indication of the second user query, the results of the first user query, and the first indication of the first user query, additional results associated with the second user query, wherein the additional results comprise one or more additional feature vectors or examples for use with the machine learning algorithm; and storing data indicative of the additional results in a feature store for use by the machine learning algorithm in training.

18. The non-transitory computer-readable medium of claim 14, wherein the first user query is associated with a token, the token indicating a state at which to generate the results associated with the first user query.

* * * * *